United States Patent [19]

Chen et al.

[11] Patent Number: 5,535,288
[45] Date of Patent: Jul. 9, 1996

[54] SYSTEM AND METHOD FOR CROSS CORRELATION WITH APPLICATION TO VIDEO MOTION VECTOR ESTIMATOR

[75] Inventors: Chih-Kang Chen; Jerome F. Duluk, Jr., both of Santa Clara County, Calif.

[73] Assignee: Silicon Engines, Inc., Palo Alto, Calif.

[21] Appl. No.: 388,181

[22] Filed: Feb. 10, 1995

Related U.S. Application Data

[63] Continuation of Ser. No. 891,940, Jun. 2, 1992, abandoned, which is a continuation-in-part of Ser. No. 885,163, May 18, 1992, abandoned.

[51] Int. Cl.⁶ .................................................. H04N 7/50
[52] U.S. Cl. .................. 382/236; 382/248; 348/407; 348/416; 348/417; 348/420
[58] Field of Search .................................. 382/30, 41, 42, 382/44, 4, 34, 43, 56, 209, 218, 276, 278, 279, 280, 232, 236, 238, 248; 348/420, 418, 400, 401, 403, 415, 416, 417, 407

[56] References Cited

U.S. PATENT DOCUMENTS

| | | | |
|---|---|---|---|
| 4,115,865 | 9/1978 | Beauvais et al. | 364/604 |
| 4,449,193 | 5/1984 | Tournois | 364/604 |
| 4,581,760 | 4/1986 | Schiller et al. | 382/4 |
| 4,669,054 | 5/1987 | Schlunt et al. | 364/822 |
| 4,695,973 | 9/1987 | Yu | 364/822 |
| 4,998,286 | 3/1991 | Tsujiuchi et al. | 382/34 |
| 5,031,038 | 7/1991 | Guillemot et al. | 348/403 |
| 5,040,223 | 8/1991 | Kamiya et al. | 382/4 |
| 5,050,220 | 9/1991 | Marsh et al. | 382/4 |
| 5,054,090 | 10/1991 | Knight et al. | 382/4 |
| 5,067,162 | 11/1991 | Driscoll, Jr. et al. | 382/5 |
| 5,189,712 | 2/1993 | Kajiwara et al. | 382/42 |
| 5,247,586 | 9/1993 | Gobert et al. | 382/42 |

OTHER PUBLICATIONS

Ernest L. Hall, Computer Image Processing and Recognition, 1979 pp. 468–484.
"Discrete Cosine Transform Algorithms, Advantages, Applications," by K. R. Rao and P. Yip, pp. 242–247.
"VLSI Processors for Signal Detection in SETI," by Duluk, et al., Oct. 4–11, 1986.
"Artificial Signal Detectors," by Linscott, Duluk, Burr, and Peterson, Jun. 1987.
"Artificial Signal Detectors," by Linscott, Duluk, Burr, and Peterson, 1988 pp. 319–355.
"The MCSA II—A Broadband, High Resolution, 60 Mchannel Spectrometer," by Linscott, et al., Nov. 1990.

*Primary Examiner*—Wendy R. Greening
*Attorney, Agent, or Firm*—Flehr, Hohbach, Test, Albritton & Herbert

[57] ABSTRACT

Method and apparatus for computing cross-correlations with application to image processing and video motion estimation, particularly in video compression applications, are described. Two-dimensional Fourier transform convolution techniques form a basis for novel techniques for performing two simultaneous two-dimensional cross correlations. The size of the input data blocks for the transformations are arbitrary. Apparatus for efficiently performing real-time cross correlations, including cross-correlations using Short Length Transforms (SLTs), using cascaded stages, multi-port memories, and multiple arithmetic units are also described. In video motion vector estimator application, data blocks within a current video frame are selected and converted to form a two-dimensional matrix of complex data. The complex matrix is transformed to the frequency domain to form the frequency domain representations of the selected data blocks. A set of search blocks within the previous video frame having a one-to-one correspondence with the selected data blocks, is then selected, converted into a complex data matrix, and transformed to the frequency domain to form the frequency domain representations of the selected search blocks. Once in the frequency domain, the sets of data corresponding to the data blocks and the search blocks are multiplied together and the product is inverse transformed to return to the spatial domain. The data then passes through an adjustment process to form the cross-correlations between the pairs of data blocks and search blocks.

16 Claims, 17 Drawing Sheets

This Figure is Prior Art

SYSTEM AND METHOD FOR CROSS CORRELATION WITH APPLICATION TO VIDEO MOTION VECTOR ESTIMATOR

This is a continuation of application Ser. No. 07/891,940 filed Jun. 2, 1992, now abandoned, which is a continuation-in-part of Ser. No. 07/885,163, filed May 18, 1992, now abandoned.

FIELD OF THE INVENTION

The field of this invention is Digital Signal Processing (DSP) and, more specifically, the field of Cross Correlation computation with application in image processing and video motion vector estimation. Application of this invention is also suitable for 2-dimensional DSP such as pattern recognition, signature analysis, and feature extraction.

BACKGROUND OF THE INVENTION

One application of video data compression is in a video teleconferencing system, and a simple block diagram of such a system is shown in FIG. 1. A video teleconferencing system allows two or more remote parties to both see and talk to each other. Each party has: a video camera 1; a video encoder 2; a video decoder 3; a video display 4; a microphone 5; an audio encoder 6; an audio decoder 7; and an audio speaker 8. Encoded video and audio is transmitted across a data channel 9.

Most video data compression applications, of which video teleconferencing is an example, have either or both a video encoder 2 and a video decoder 3. Example schemes for a video encoder 2 and a video decoder 3 are shown in FIG. 2 and FIG. 3, respectively.

Efficient video compression involves the combination of transform coding and predictive coding. This type of compression scheme is sometimes called full motion compression and has being incorporated into, for example, the Consultative Committee for International Telegraphy and Telephony (CCITT) H.261 standard. In this scheme, a video encoder 2 predicts 19 the current picture frame using motion vectors 21 and the previous picture frame stored in the frame memory 23, then computes the error 25 of the predicted picture frame 19 when compared to the current picture frame 27. Motion vectors 21 are generated in the motion vector estimator 28, which compares the current frame 27 with the previous frame (stored in frame memory 23) and finds a "best" match, generally on a block-by-block basis. The encoder then codes the prediction error using a Discrete Cosine Transform (DCT) based transform 29, quantizes the data in a quantizer (Q) 31, and sends it along with the motion vectors 21 over a transmission channel 9 after sending them through a variable length coder (VLC) 33. At the receiving end, the decoder 3 uses the motion vectors 21 and the previous picture frame stored in the frame memory 35 to predict the current picture frame 37 and then adds the prediction error from the inverse DCT (IDCT) 39 to the predicted frame before displaying it 41.

The description of a video encoder 2 and a video decoder 3 is very simple and generalized, and is included here to show the critical role played by motion vectors in video compression applications. The process of motion vector estimation is an essential and computationally expensive part of inter-frame predictive coding which is needed to achieve high compression ratios. The present patent presents a system and method for cross correlation, which can be used for motion vector estimator 28 and, therefore, be included in a video encoder 2.

A picture frame is made of many blocks of pixels, commonly called macro blocks. For example, in the Common Interchange Format (CIF), the picture frame has 22×18 macro blocks, where each macro block consists of 16×16 pixels. In inter-frame encoding mode, a motion vector for each macro block must be estimated and sent along with the encoded prediction error for the macro block. Motion vector estimation is done by comparing a macro block in the present frame to a search block in the previous frame and finding a "best" match. The motion vector is estimated to be the offset between the position of the macro block in the present frame and the location of the "best" matching area within the search block. Typically, the search block is restricted to 32×32 pixels and is centered at the same location within the picture frame as the macro block. The "best" match is a subject to the cost function used for evaluating the various choices, and a variety of cost functions have been discussed in the literature. In the book, "Discrete Cosine Transform Algorithms, Advantages, Applications", by K. R. Rao and P. Yip, published by Academic Press, Inc. San Diego, Calif., 1990, cost functions are described on pages 242 to 247. The commonly used cost function is sum of absolute differences, and is mathematically expressed as Equation 1.

$$C_{MAE}(n,m) = \frac{1}{16 \times 16} \sum_{i=0}^{15} \sum_{l=0}^{15} |x(i,l) - y(i+n, l+m)| \quad \text{(EQ 1)}$$
$$n,m = 0, \ldots, 16$$

In Equation 1, $x(i,l)$ with $i,l=0, \ldots, 15$ is the macro block in the current picture frame, and $y(i,l)$ with $i,l=0, \ldots, 31$ is the search block in the previous frame. For each motion vector estimate, a total of 17×17=289 two-dimensional summations are computed, and the smallest value determines the "best" motion vector estimate. This algorithm is sometimes referred to as the mean absolute error (MAE) algorithm. The MAE algorithm has been implemented in an integrated circuit, the L64720 Video Motion Estimation Processor (MEP) from LSI Logic Corporation, Milpitas, Calif. The computation for the MAE is relatively simple, and the algorithm is effective in providing motion vector estimates for video transmission where high data rate, and hence low compression ratio, is allowed. For example, in video conferencing using transmission lines with 128 kbits per second or more, this is quite adequate. However, for lower data rate transmissions which require higher compression ratios, a more accurate motion vector estimation process is required since it provides better prediction and hence, reduction of the error which is transmitted or stored in inter-frame coding.

An alternative, but better, cost function is the cross correlation function (CCF). The CCF is a more powerful cost function for determining data block matches, however it has not been implemented in any real time systems due to its computational complexity. The CCF is given by Equation 2.

$$C_{CCF}(n,m) = \frac{\sum_{i=0}^{15}\sum_{l=0}^{15} x(i,l)y(i+n,l+m) - \sum_{i,l=0}^{15} x(i,l) \sum_{i,l=0}^{15} y(i+n,l+m)}{\sqrt{\sum_{i,l=0}^{15} x^2(i,l) - \left(\sum_{i,l=0}^{15} x(i,l)\right)^2} \sqrt{\sum_{i,l=0}^{15} y^2(i+n,l+m) - \left(\sum_{i,l=0}^{15} y(i+n,l+m)\right)^2}} \quad \text{(EQ 2)}$$

Again, a total of 289 values must be computed, and the largest one determines the "best" motion vector estimate. Clearly, the computation of the CCF involves multiplication and is, therefore, more computationally expensive than MAE, which needs only addition and absolute value. The CCF, as defined above in Equation 2, also requires square root, which can be avoided by squaring the entire expression. Thee squared version of CCF, called CCF2, is shown in Equation 3.

$$C_{CCF2}(n,m) = \frac{\left[\sum_{i=0}^{15}\sum_{l=0}^{15} x(i,l)y(i+n,l+m) - \sum_{i,l=0}^{15} x(i,l) \sum_{i,l=0}^{15} y(i+n,l+m)\right]^2}{\left[\sum_{i,l=0}^{15} x^2(i,l) - \left(\sum_{i,l=0}^{15} x(i,l)\right)^2\right]\left[\sum_{i,l=0}^{15} y^2(i+n,l+m) - \left(\sum_{i,l=0}^{15} y(i+n,l+m)\right)^2\right]} \quad \text{(EQ 3)}$$

The CCF or CCF2 approach can estimate the match more precisely, and hence, a more accurate motion vector can be estimated. This is crucial if a higher data compression ratio is to be achieved. For example, it is especially important to achieve a higher compression ratio when a standard analog telephone line, which, at present, supports up to only 19.2 kilobits per second, is used to transmit video signals.

An additional variation of the CCF, which can be used for motion vector estimation, is the cross covariance, CCV, as shown in Equation 4. The CCV is simply the numerator of the CCF, thus eliminating the need to compute the denominator and its square roots. Similarly, the largest value of CCV determines the "best" match.

$$C_{CCV}(n,m) = \sum_{i=0}^{15}\sum_{l=0}^{15} x(i,l)y(i+n,l+m) - \quad \text{(EQ 4)}$$
$$\sum_{i,l=0}^{15} x(i,l) \sum_{i,l=0}^{15} y(i+n,l+m)$$

Another approach to motion vector estimation is the normalized mean square error, NMSE, which is shown in Equation 5, and the smallest value determines the "best" match.

$$C_{NMSE}(n,m) = \frac{\sum_{i,l=0}^{15} x^2(i,l) + \sum_{i,l=0}^{15} y^2(i+n,l+m) - 2\sum_{i=0}^{15}\sum_{l=0}^{15} x(i,l)y(i+n,l+m)}{\sum_{i,l=0}^{15} x^2(i,l)} \quad \text{(EQ 5)}$$

The NMSE can be simplified by eliminating its denominator to form the mean square error approach, MSE, shown as Equation 6, and the smallest value determines the "best" match.

$$C_{MSE}(n,m) = \sum_{i,l=0}^{15} x^2(i,l) + \sum_{i,l=0}^{15} y^2(i+n,l+m) - \quad \text{(EQ 6)}$$
$$2\sum_{i=0}^{15}\sum_{l=0}^{15} x(i,l)y(i+n,l+m)$$

The present invention describes a method and apparatus that efficiently computes the computationally expensive summation common to Equation 2 through Equation 6, which is shown in Equation 7, and hereinafter called simply the "cross correlation". Cross correlation can itself be used as a cost function for motion vector estimation.

$$c(n,m) = \sum_{i=0}^{15}\sum_{l=0}^{15} x(i,l)y(i+n,l+m) \quad \text{(EQ 7)}$$
$$n,m = 0, \ldots, 16$$

Direct calculation of the cross correlation requires 256 multiplies and 255 adds for each resulting value. The innovative method presented here converts the two blocks, both the macro block and the search block, to their frequency domain representation via the Discrete Fourier Transform (DFT) and then multiplies the two blocks together to form a product matrix in the frequency domain. The frequency domain result is then convened back to spatial domain and the 289 cross correlation values are simultaneously available to be searched for the maximum value. The present patent describes a complete method for this computation and includes several particularly innovative "tricks" which make the method attractive for implementation in hardware.

In the detailed description of the invention, the method is illustrated graphically and each stage is precisely described. Since various block sizes can be chosen and also since cross correlation for block matching has applications in many areas, such as pattern recognition, signature analysis, and feature extraction, the dimensions in the figures and description are kept in general terms.

In this Digital Signal Processing (DSP) application, namely cross correlation computation, there is a need to perform numerical data processing at a very high rate. In many DSP architectures, high data rate processing is achieved through the use of multiple Arithmetic Units (AU) such as combinations of adders, multipliers, accumulators, dividers, shifters, and multiplexors. However, there are two major difficulties with using multiple AUs in parallel: first, many control signals are needed to control multiple AUs; and, second, it is difficult to get the correct data words to each AU input on every clock cycle.

Some DSP architectures are Single Instruction Multiple Data (SIMD) architectures. A SIMD architecture, as defined here, groups its AUs into identical Processors, and these Processors perform the same operation on every clock cycle, except on different data. Hence, a Processor within a SIMD architecture can have multiple AUs, with each AU operating in bit parallel fashion (some definitions of SIMD architectures have AUs operating in bit serial fashion, which is not the case here). The SIMD architecture is applicable to video image compression because images are split into identically sized blocks which can be processed in parallel. If there are four Processors, then four blocks within the image can be processed in parallel, and the Processors are controlled in parallel with the same instruction stream.

Many DSP applications, especially real-time applications such as video compression, perform the same set of operations over and over. In video compression, successive images are compressed continuously with the same set of operations. Within the complex function of video compression, there are simpler functions such as convolution, Fourier transform, and correlation, to name only a few. These simpler functions can be viewed as subroutines of the complex function of video compression. These simple functions can be broken down further into elementary subroutines; for example, the 2-dimensional Discrete Foutier Transform (DFT) of a 32×32 data matrix can be implemented with 64 calls to an elementary subroutine which performs an 32-point DFT. The cross correlation method of the present patent includes a SIMD architecture which efficiently performs a wide variety of elementary subroutines, including those needed for cross correlation computation.

OVERVIEW OF THE INVENTION

This invention describes two efficient methods for computing cross correlation of two 2-dimensional data blocks. First, step-by-step operations represented by a set of equations on input data blocks are presented. Though the intended application is motion vector estimation in video compression applications, the method is suitable for many applications. Therefore, the dimensions of input data blocks are arbitrary. Since several key operational steps within the method are Discrete Fourier Transforms (DFTs), the description goes on to introduce a set of DSP architectures which compute a special class of DFT algorithms as well as the other steps required to complete the entire method.

Computation of a cross correlation of two linear, that is, one dimensional, sequences is essentially a convolution process. It has long been known that convolutions can be performed by fast convolution techniques which utilize DFTs. In essence, a convolution can be performed by performing a Fourier transform on the two data records, multiplying the transform results together, and then performing an inverse Fourier transform on the product to get the final result. In the book, "Fast Fourier Transform and Convolution Algorithms" by H. J. Nussbaumer, second edition published by Springer-Verlag in 1982, many fast convolution algorithms are discussed. The present patent utilizes the fundamental concept of convolution by Fourier transform and expands it to two dimensions and adds the necessary additional steps to perform two simultaneous 2-dimensional cross correlations.

Figure 1:
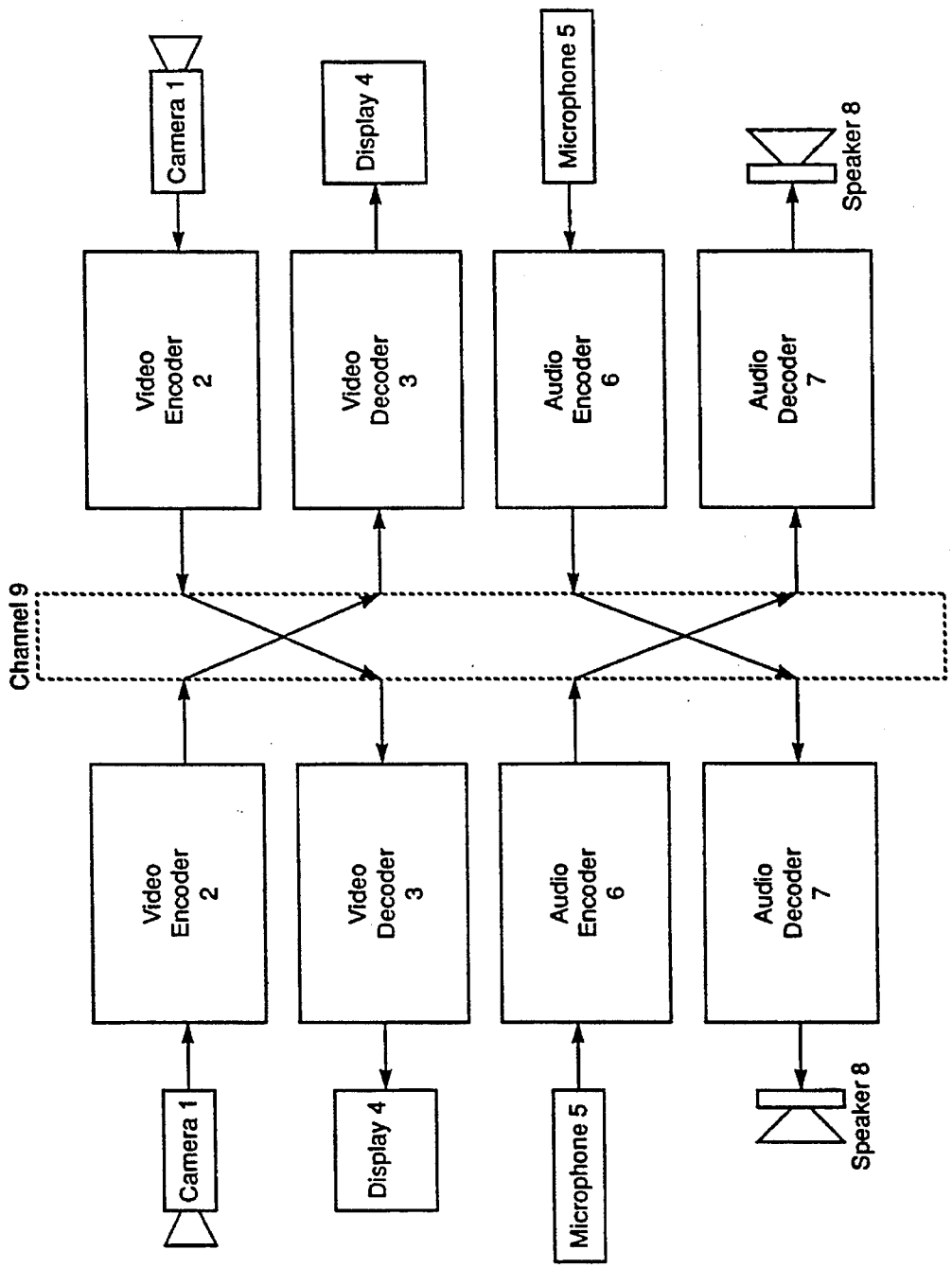
FIG. 1: Video teleconferencing system.
Figure 2:
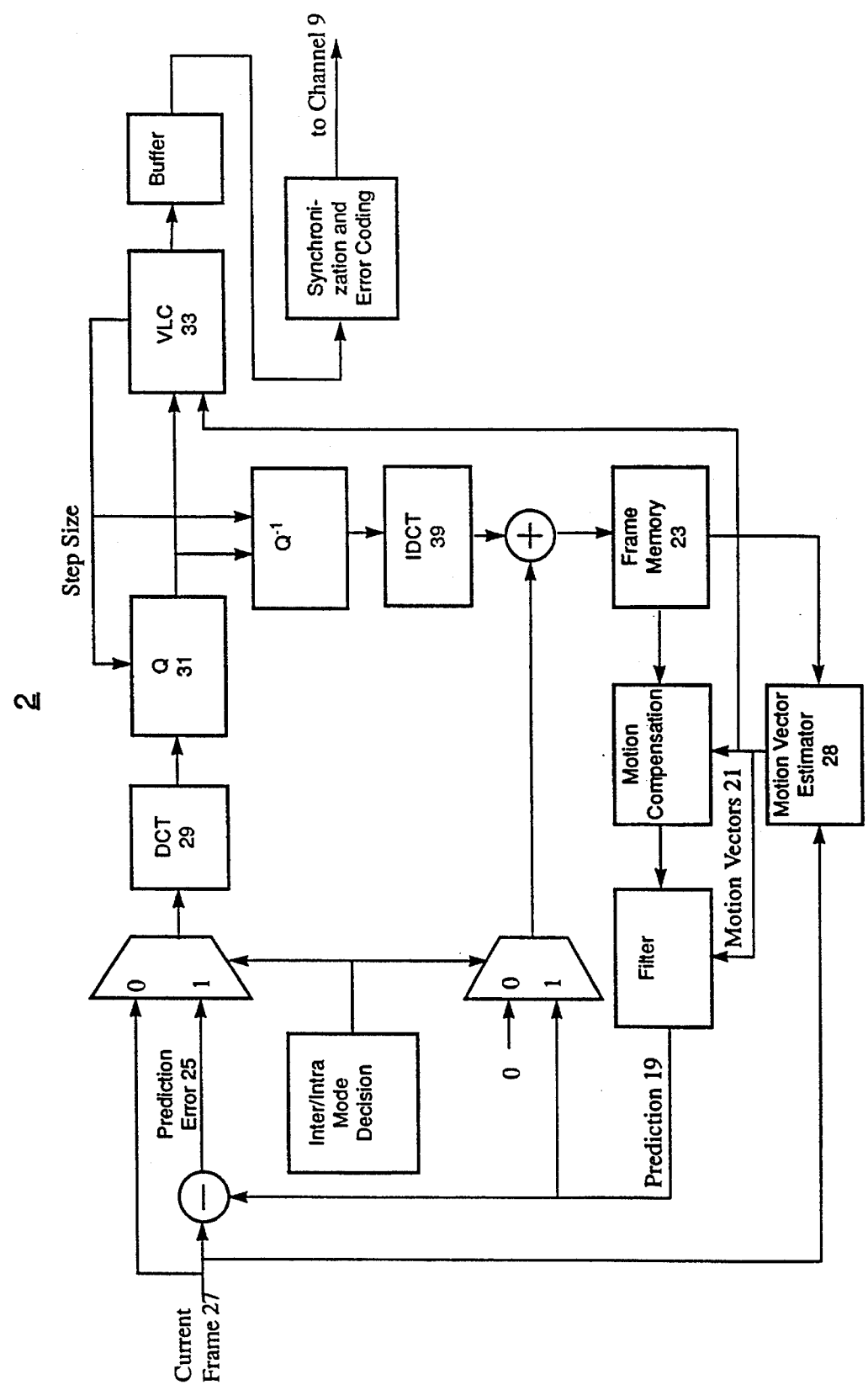
FIG. 2: Video encoder.
Figure 3:
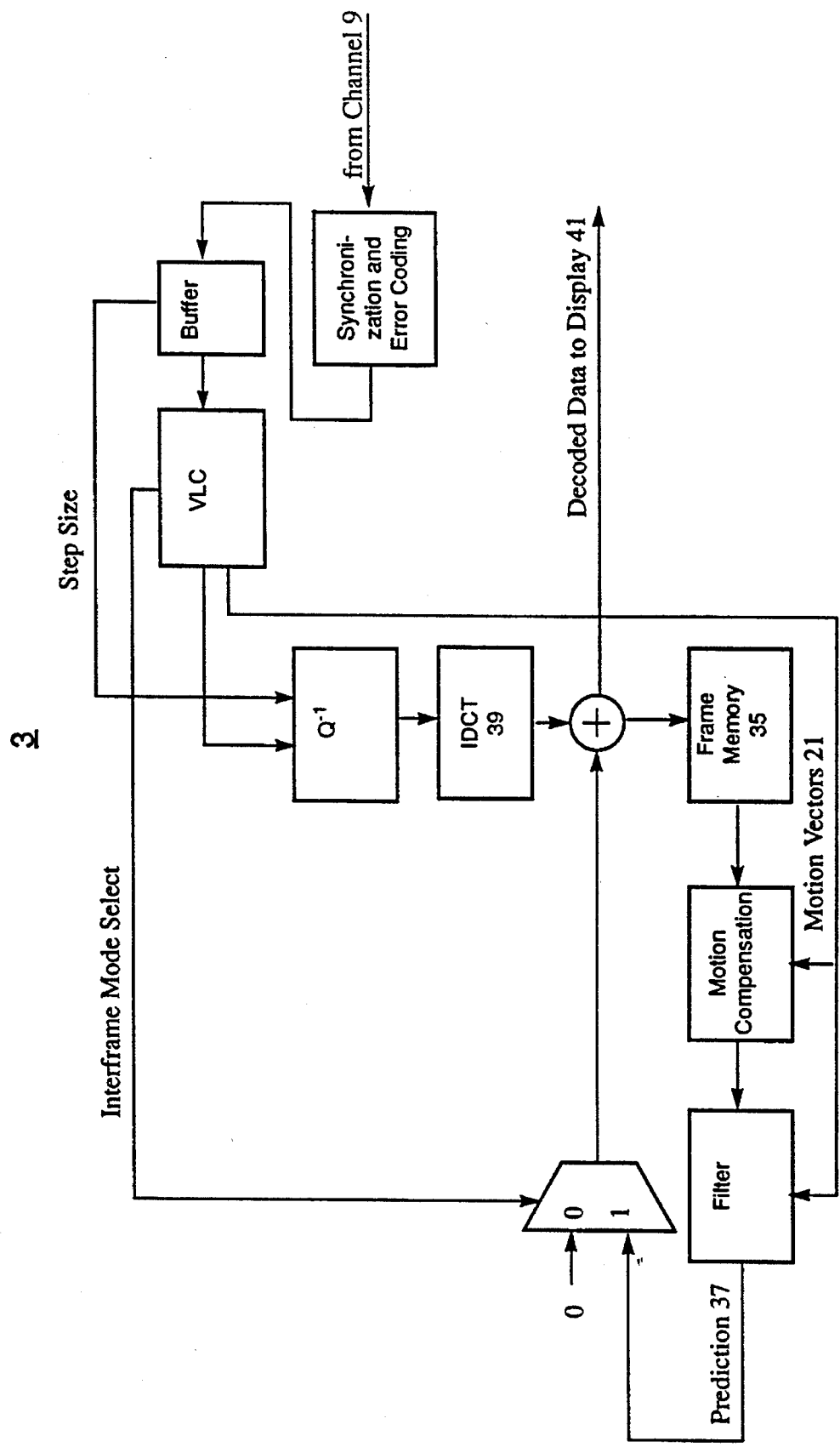
FIG. 3: Video decoder.
Figure 4:
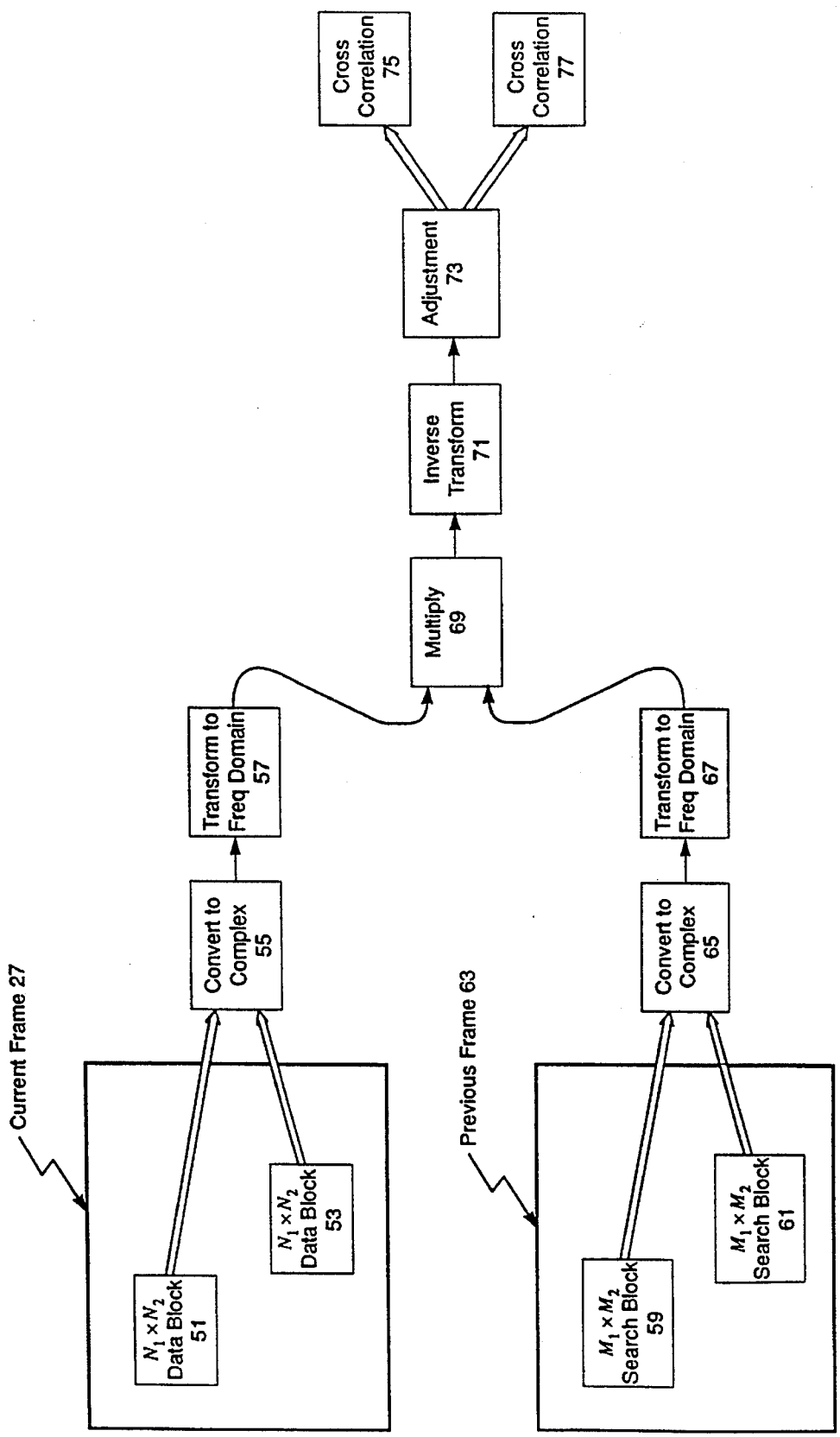
FIG. 4: Overview of the cross correlation method for motion vector estimation.

FIG. 4 is an overview of the method of the present patent as it is applied to motion vector estimation. One or more data blocks 51,53 within the present frame 27 are selected and converted 55 to form a matrix of complex data. Next, the complex matrix is transformed 57 to the frequency domain to form the frequency domain representations of the selected data blocks 51,53. A set of search blocks 59,61 within the previous frame 63, with a one-to-one correspondence to the selected data blocks 51,53, is also selected, convened 65 into a complex data matrix, and transformed 67 to the frequency domain to form the frequency domain representations of the selected search blocks 59,61. Once in the frequency domain, the two sets of data are multiplied 69 together, then inverse transformed 71 to get back to the spatial domain. The data then passes through an adjustment process 73 to form the cross correlations 75,77 between the pairs (pairs in the diagram are: 51 and 59; 53 and 61) of data blocks 51,53 and search blocks 59,61.

Figure 5:
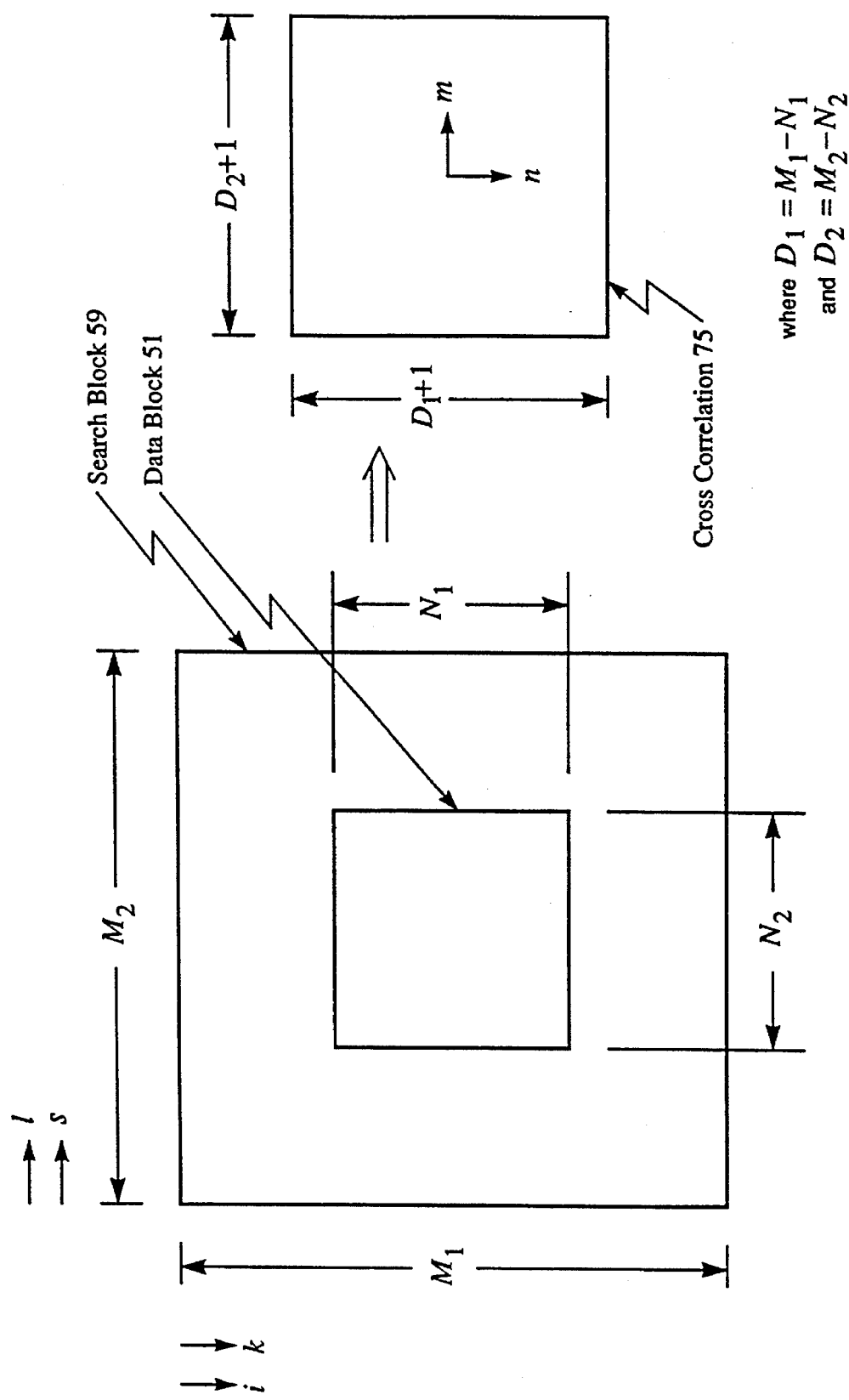
FIG. 5: Relative sizes of the search block, data block, and cross correlation for motion vector estimation.

FIG. 5 is a representation of the relative sizes of the search block 59, data block 51, and cross correlation 75. For example, this figure can be viewed as a pictorial representation of Equation 7 in which $M_1=M_2=32$, $N_1=N_2=16$, $D_1=D_2=16$, and y(i+n,l+m) replaced with y(i+n −8,l+m−8) where n,m=8, . . . , 8. The data block 51 is always smaller than the search block 59. The size of each dimension of the cross correlation 75 is less than or equal to one plus the difference of the corresponding dimensions of the search block 59 and the data block 51. For optimal use of computation in the method of the present patent, the size of each dimension of the cross correlation 75 is exactly equal to one plus the difference of the corresponding dimensions of the search block 59 and the data block 51. In essence, one cross correlation 75 value places the data block 51 at a particular location within the search block 59, multiplies the corresponding entries in the two blocks 51,59 together (that is, those values on top of each other in FIG. 5), and sums these products. For other cross correlation 75 values, different locations of the data block 51 within the search block 59 are chosen. The cross correlation 75 is a matrix of values which contains all the possible overlaps of the data block 51 within the search block 59. The method of the present patent includes the step "convert to complex" 55 for the data block 51 which not only makes complex data values, but also pads the resulting data matrix with zeros so that the resulting matrix is the same size as that generated by the "convert to complex" 65 step for the search block 59. This step allows to compute spatial correlation using DFT and frequency domain multiplication. The method of the present patent successfully avoids padding the search block 59 with zeros by only keeping the cross correlation 75 values which are of interest (that is, $D_1+1 \times D_2+1$ values) even though more values can be calculated (that is, $M_1 \times N_2$ values). For motion vector estimation, the cross correlation 75 values are searched for the largest value. If other approaches, such as CCF, CCF2, CCV, NMSE, or MSE, are used, additional computation is performed on the cross correlation 75 values before they are searched.

The DFT most naturally operates on, and generates, complex dam. The classic example of this is the standard Fast Fourier Transform (FFT) algorithm which uses successive stages of radix-2 "butterflies" for computing transforms of length $2^a$, where a is an integer. However, the applications of interest here do not start with complex data, they start with real data. There exist DFT algorithms for real-only data, but they are not as computationally efficient as complex DFT algorithms.

The two methods, Method A 100 and Method B 101, that take the advantage of the DFT property of operating on complex data are presented below. Method A 100 takes two pairs of real input blocks and computes two cross correlation simultaneously, whereas Method B 101 takes one pair of real input blocks and computes one cross correlation. While both methods can be performed on the same hardware architecture, Method A 100 contains more repetitions of elementary subroutines and Method B 101 requires less cache memory.

Figure 6:
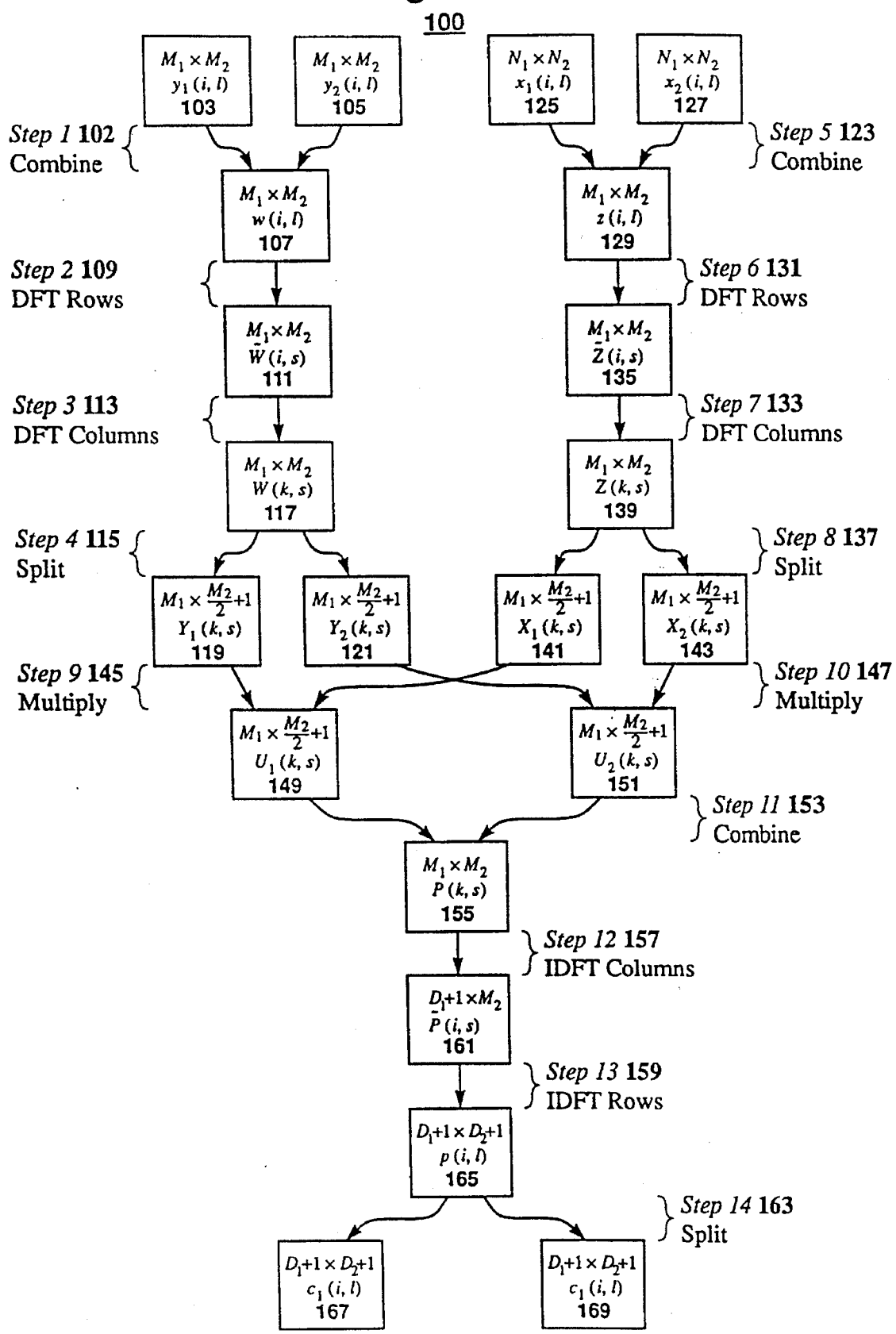
FIG. 6: Cross correlation method for estimating motion vectors for two pairs of data blocks.

FIG. 6 is a pictorial representation of Method A 100 of the invention of the present patent. In this section of the patent, a general textual description of the method is given, with a following mathematical description under the detailed description section. Each box in FIG. 6 represents a block of data, and arrows represent processing steps performed on the blocks of data. Step 1 102 takes two input blocks 103,105 of real data (two search blocks for motion vector estimation) and combines them into a single block 107 of complex data by making the first input block 103 the real part and the second input block 105 the imaginary part. This is an innovative part of the method which allows performing two simultaneous 2-dimensional cross correlations, In Step 2 109, the resulting block 107 of Step 1 102 has DFTs performed along each of its rows, resulting in a new block of data 111. For Step 2 109, a special type of DFT can be performed, namely the Short Length Transform (SLT), as described on pages 144 to 150 of Nussbaumer's book. The SLT minimizes the number of operations, especially multiplies, but requires more complicated hardware architectures and controls to realize it for real time applications. Consequently, the SLTs have not been used in real time cross correlation because there has not been a good hardware architecture for SLT computation; the present method solves this problem with the architectures described later. In Step 3 113, DFTs are performed along the columns of the block 111 resulting from Step 2 109; and an SLT can also be used here. In Step 4 115, the resultant block 117 of Step 3 113 is split into two blocks 119,121, where these two blocks 119,121 are each of conjugate symmetry and are the frequency domain representation of the two real input data blocks 103,105. In other words, the two blocks 119,121 are made up of pairs of complex numbers that are conjugate of each other. This means only half of the data points in the blocks 119,121 need to be generated, thus saving computation. Exact details of the innovative set of operations which take advantage of this symmetry are described in the detailed description section.

Step 5 123 in FIG. 6 takes two input blocks of real data 125,127 (two macro blocks for motion vector estimation) and combines them into one block of complex data 129 by making the first input block 125 the real part and the second input block 127 the imaginary part. The two input blocks 125,127 for Step 5 123 are smaller than the input blocks 103,105 in Step 1 102 and, therefore, the resultant block of Step 5 123 must be padded with zeros to increase it size to be the same as the resultant block from Step 1 102. Like Step 1 102, Step 5 123 allows the performing of two simultaneous 2-dimensional cross correlations. Step 6 131 is a set of DFTs along the rows of the resultant block 129 of Step 5 123 and here again SLTs can be used. However, since the resultant block 129 of Step 5 123 has been padded with zeros, only some of the rows need to be transformed, thus a saving in computations by reducing the number of DFTs required. In addition, since some of the elements in these rows of the resultant block 129 are zero due to the zero padding of Step 5 123, special SLTs can be developed to further reduce the total number of computations. This new special SLT will be described in detail later. Step 7 133 is a set of DFTs along the columns of the resultant block 135 of Step 6 131. In Step 8 137, the resultant block 139 of Step 7 133 is split into two blocks 141,143, where these two blocks 141,143 are each of conjugate symmetry and are the frequency domain representation of the two real input data blocks 125,127 for Step 5 123. Step 8 137 has the same innovative features as Step 4 115.

Steps 1 102 through 8 137 take four input blocks 103, 105,125,127 and generate their respective frequency domain representations 119,121,141,143. Steps 9 145 and 10 147 each take pairs of these frequency domain blocks (pairs: 119 and 141; 121 and 143) and multiply them together to form two new blocks 149,151. These two blocks 149,151 have similar conjugate symmetry, so once again computations are saved because only half of each block 149,151 needs to be computed. Step 11 153 merges the resultant blocks 149,151 of Steps 9 145 and 10 147 together to form one block 155 of complex data. This innovative merge step generally produces a complex matrix 155 without conjugate symmetries, and the mathematical operations are described later.

Step 12 157 is a set of inverse DFTs, or IDFTs, along the columns of the resultant block 155 of Step 11 153. Step 13 159 is a set of IDFTs along the rows of the resultant block 161 of Step 12 157. The SLTs are used in both Step 12 157 and Step 13 159. Step 14 163, the final step in generating the two desired cross correlations, is done by simply splitting the resultant block 165 of Step 13 159 into two blocks 167,169 by taking the real part and the imaginary part. Since the resulting blocks 167,169 are smaller than the normally expected resultant block 165 of Step 13 159, it turns out IDFTs need only be applied to some of the block rows in Step 13 159, thus allowing another reduction in the total computations. This, in turn, means some of the rows of the resultant block 161 in Step 12 157 are not needed, and another special SLT can be developed to further reduce the number of total computations. For motion vector estimation, the two resultant blocks 167,169 of Step 14 163 are each searched for their largest value, and the indices of these two maximum values are the two estimated motion vectors for the two macro blocks 125,127 which were inputs to Step 5 123.

In the above method, the order of performing row DFTs and column DFTs is arbitrary, and hence, can be interchanged. For example, Step 2 109 can perform DFTs on columns, provided Step 3 113 performs DFTs on rows. Likewise, when only half of a data block 119,121,141,143, 149,151 is needed to be computed, it is an arbitrary choice as to which half is computed.

Figure 7:
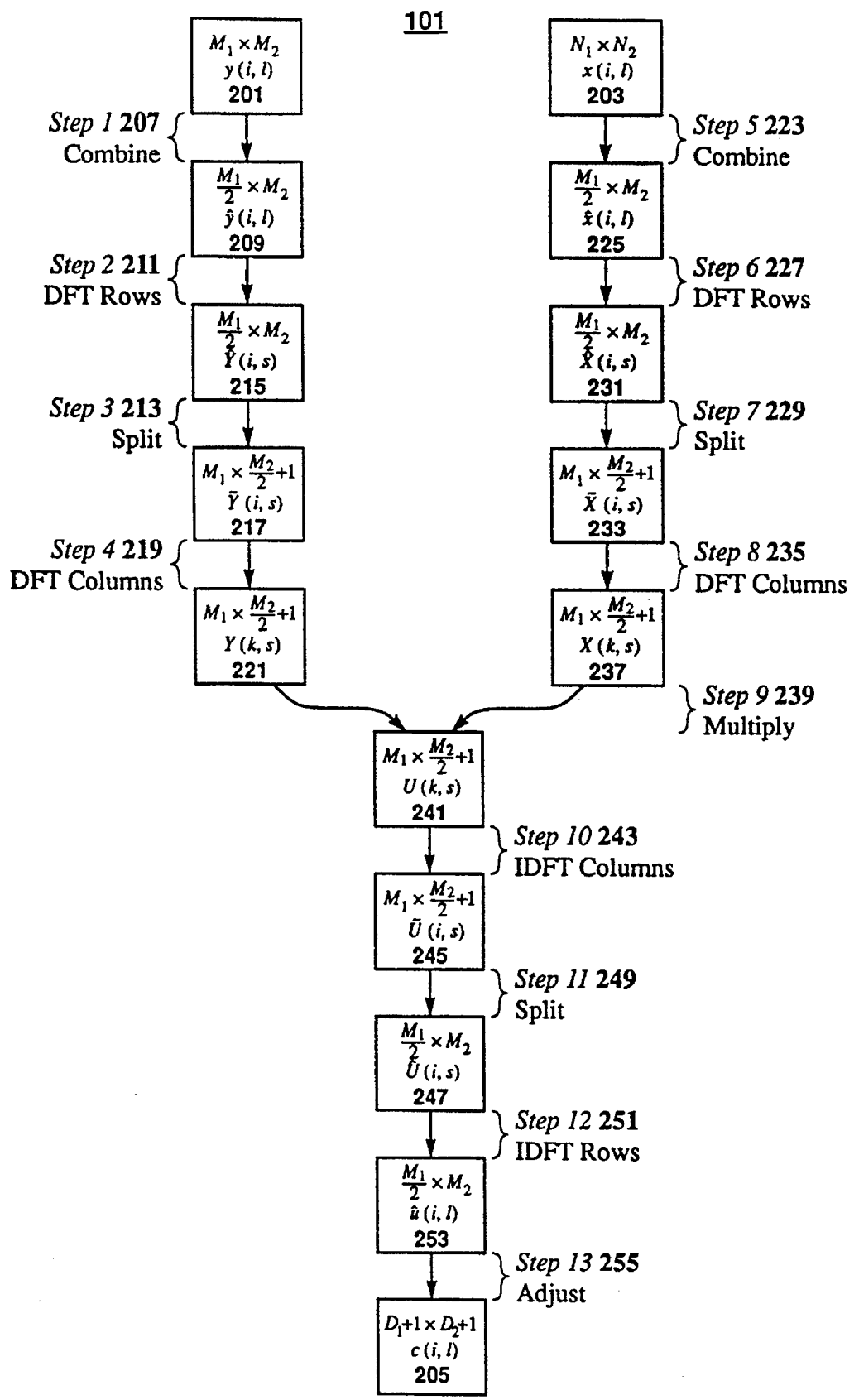
FIG. 7: Cross correlation method for estimating motion vectors for one pair of data block.

FIG. 7 shows the procedures for Method B 101. In this method, only two data blocks 201,203 are input to the system and one cross correlation 205 is computed. Step 1 207 combines the search block 201 into a complex data block 209 by making the upper half of input block 201 the real part and the lower half 201 the imaginary part. As the result, this complex block 209 only has half the size of the input block 201. This is an innovative part of the method that allows the use of DFT on complex data and the reduction of the number of DFTs required. In Step 2 211, DFTs are performed along the rows of the complex block 209. In Step 3 213, the resultant block 215 is then split into a new complex block 217 that corresponds to the input search block 201 with its rows DFTed. The splitting done in Step 3 213 generates only half the number of columns of the block 217 since the other half has the conjugate symmetry property. DFTs along the columns of the block 217 are performed in Step 4 219. The resultant block 221 is the frequency domain representation of the input search block 201.

In Step 5 223, the data block 203 is mapped into a complex data block 225 in the way similar to Step 1 207. Since the data block 203 has smaller size, the lower center portion of resultant complex data block 225 are nonzero and the rest are zero-padded to the same size as the block 209. Next, row DFTs are performed on the complex data block 225 in Step 6 227. In Step 7 229, the row DFTed block 231 is split to form a new complex data block 233 to be column DFTed. Similar to the block resulting from splitting in Step 3 213, this complex block 233 has conjugate symmetry and half of it are generated. In Step 8 235, DFTs are performed along the columns of the block 233 to yield the frequency domain representation 237 of the input data block 203.

The frequency domain multiplication is performed in Step 9 239 but only the half the data are computed in the resultant block 241 due to conjugate symmetry.

IDFTs along the columns of the block 241 are performed in Step 10 243. Before performing the IDFT on the rows, the resultant block 245 must first be split into another complex block 247 in Step 11 249. The resultant block 247 is then IDFTed in Step 12 251 along its rows to result the spatial domain block 253. Finally, in Step 13 255, the cross correlation 205 is obtained from the spatial domain block 253, which involves no operation.

Like Method A 100, SLTs are used to perform both DFTs and IDFTs. Since blocks 225,231 contain zeros in their rows and columns, special SLTs can be used to reduce the total number of operations.

Figure 8:
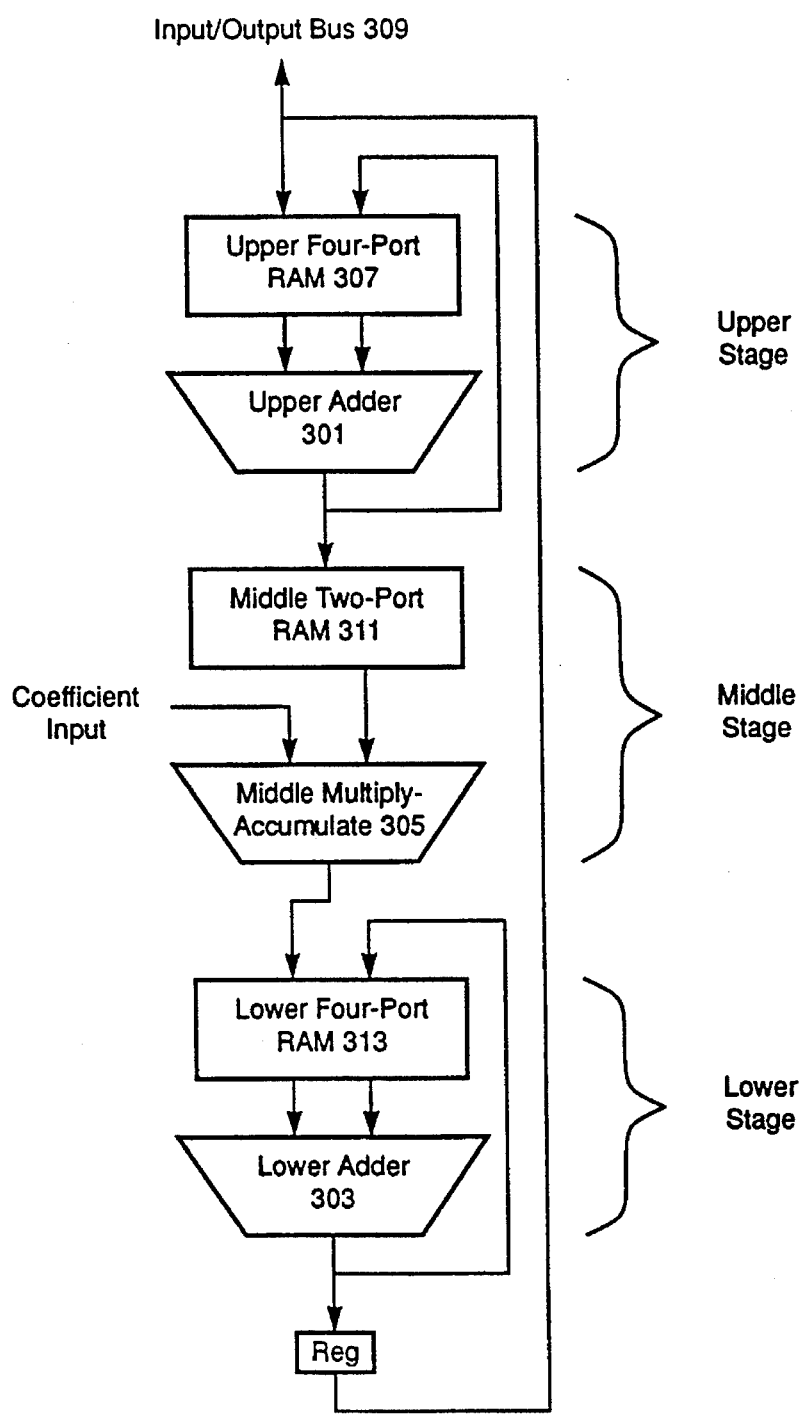
FIG. 8: Three stage Processor architecture for computing SLTs. This is prior an for the present patent.

Many elementary subroutines utilized above (for example, DFT, IDFT, and SLT) can be described as a cascade of adds and multiplies, and architectures which are well matched to specific elementary subroutines can perform these elementary subroutines in a single pass. For example, in Nussbaumer's book, the equations for SLTs can be viewed as an add-multiply-accumulate-add process. That is, input data points are added and subtracted in various ways to form the first set of intermediate results; the first set of intermediate results are multiply-accumulated in various ways to form the second set of intermediate results; and the second set of intermediate results are added and subtracted in various ways to form the final results. The hardware for this three-stage process of add-subtract, followed by multiply-accumulate and then by add-subtract, is shown in FIG. 8. The architecture of FIG. 8 was utilized in the SETI DSP Engine design done at Stanford University in 1984, and is therefore, prior an for the present patent. The SETI DSP Engine architecture was published in four places: 1) "VLSI Processors for Signal Detection in SETI" by Duluk, et. al., 37th International Astronautical Congress in Innsbruck, Austria, Oct. 4–11, 1986; 2) "Artificial Signal Detectors" by Linscott, Duluk, Burr, and Peterson, International Astronomical Union, Colloquium No. 99, Lake Balaton, Hungary, June 1987; 3) "Artificial Signal Detectors", by Linscott, Duluk, Burr, and Peterson, included in the book "Bioastronomy—The Next Steps", edited by George Marx, Kluwer Academic Publishing, pages 319–335, 1988; and 4) "The MCSA II—A Broadband, High Resolution, 60 Mchannel Spectrometer", by Linscott, et. al. (including Duluk, an author of the present patent), 24th Annual Asilomar Conference on Circuits, Systems, and Computers, November 1990.

The architecture of FIG. 8, which is prior art, can perform three arithmetic operations in parallel: two add-subtracts and one multiply-accumulate. The add-subtracts are performed in the Upper Adder 301 and the Lower Adder 303; while the multiply-accumulate is performed in the Middle Multiply-Accumulate 305. The parallelism of three simultaneous arithmetic operations is achieved through the use of multiport Random Access Memories (RAM), sometimes called multiport register files. The three multiport RAMs in FIG. 8 can perform ten simultaneous read or write operations. The Upper Four-port RAM 307 simultaneously performs: two read operations for the operands of the Upper Adder 301; one write operation for the Upper Adder 301 result; and one write operation for data from the Input/Output Bus 309. The Middle Two-port RAM 311 and the Lower Four-port RAM 313 perform similar functions.

The Processor architecture of FIG. 8, however, has limitations such as i) requiring data to be multiplied by the value "one" to get from the output of the Upper Adder 301 to the input of the Lower Adder 303; ii) no provisions for directly manipulating complex numbers; iii) allowing only one multiply-accumulate per pass through the architecture, and hence, only one multiply-accumulate per elementary subroutine; iv) only one AU per stage; v) only one Input/Output Bus 309; and vi) it is highly specialized for SLT computation. The Processor architecture of the present patent overcomes these limitations.

Figure 9:
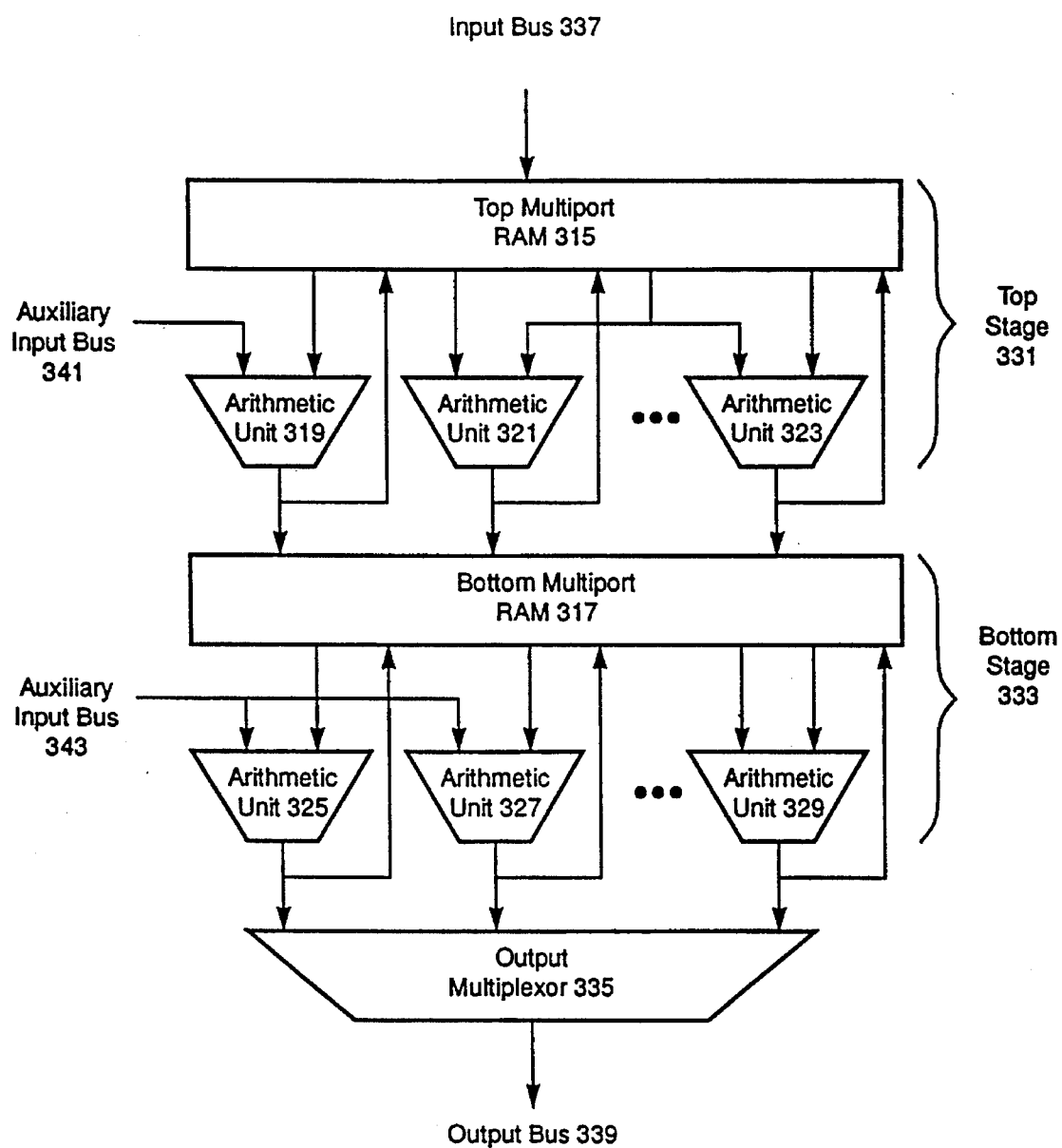
FIG. 9: General block diagram of a Two Stage Processor utilizing two multiport memories. Arithmetic Units (AUs) in the Top Stage get their operands from the Top Multiport RAM and the Arithmetic Units in the Bottom Stage get their operands from the Bottom Multiport RAM. AU outputs are both stored back into the same stage's multiport RAM and passed either to the next stage or the Output Bus.

The general block diagram of a Two Stage Processor utilizing two multiport memories 315,317 and multiple AUs 319,321,323,325,327,329 is shown in FIG. 9. The architecture can be viewed as two cascaded stages: the Top Stage 331 and the Bottom Stage 333. In general, AUs 319,321,323 in the Top Stage 331 get their operands from the Top Multiport RAM 315 and the Arithmetic Units 325,327,329 in the Bottom Stage 333 get their operands from the Bottom Multiport RAM 317. There is not necessarily a one-to-one correspondence between outputs from Multiport RAM 315, 317 read ports and AU 319,321,323,325,327,329 operand inputs. AU outputs can be i) both stored back into the same stage's multiport RAM ii) passed either to the next stage or the Output Multiplexor 335, or iii) both of the previous. There is an Input Bus 337 and an Output Bus 339, thus allowing two simultaneous I/O operations. AUs 319,321,325 can also get operands from a Auxiliary Input Buses 341,343, which is necessary for special data, such as constant coefficients within elementary subroutines.

Figure 10:
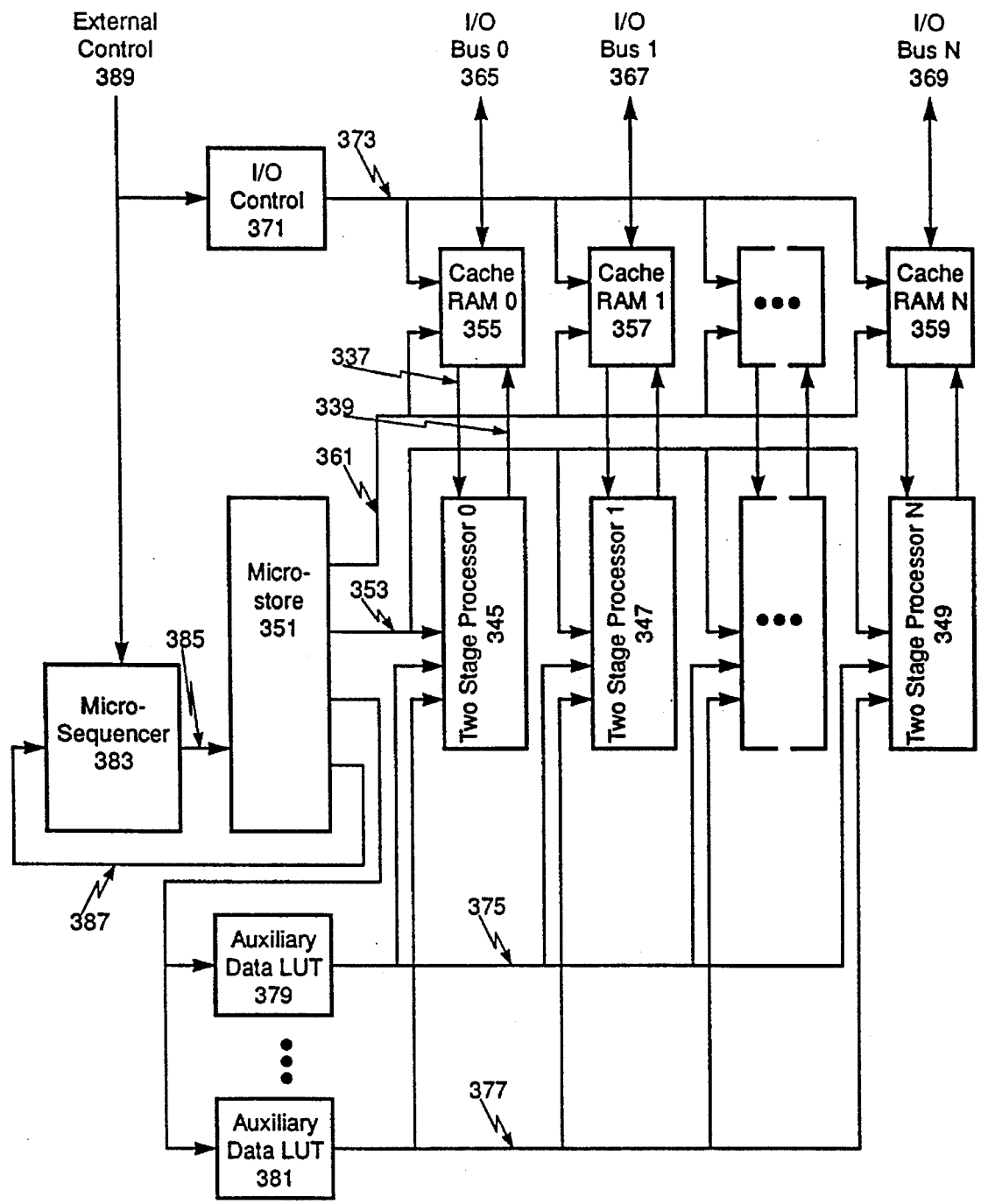
FIG. 10: SIMD architecture utilizing parallel Two Stage Processors.

Multiple Two Stage Processors 345,347,349 can operate in a SIMD configuration, and FIG. 10 shows N Two Stage Processors 345,347,349 running in parallel. Each Two Stage Processor 345,347,349 receives the same microcode instruction from the Microstore 351 via the Microinstruction Bus 353; hence the "Single Instruction" part of SIMD. The operations within a Two Stage Processor 345,347,349 are specified by single microcode instruction and these operations include: 1) all the operations of each AU 319,321,323, 325,327,329, 2) all multiport RAM 315,317 addresses and control; and 3) additional control bits, such as those for the Output Multiplexor 335. Therefore, one instruction specifies many operations. The Microstore 351 may include RAM, ROM, and logic, depending on the implementation. The Microstore 351 must be designed to account for pipe stages in A Us as well as for registers which could be placed at the input and output of RAMs.

Each Two Stage Processor 345,347,349 has its own Cache RAM 355,357,359 which supplies its data; hence the "Multiple Data" pan of SIMD. Cache RAMs 355,357,359 can be multiport RAM, a set of bank-switched single-port RAMs, or a mixture of single-port and multiport RAMs. In FIG. 10, each Cache RAM 355,357,359 includes address generation for interfacing with both its I/O Bus and its Two Stage Processor 345,347,349; however, if the addresses for either of these interfaces was always the same, at least some of the address generation logic can be shared between Cache RAMs 355,357,359. In either case, the address generation logic used for transferring data between Cache RAMs 355,357,359 and Two Stage Processors 345,347,349 is controlled by bits from the Microstore 351 via the Cache Control Bus 361. Address generation logic used for transferring data between Cache RAMs 355,357,359 and the I/O Buses 365,367,369 is controlled by a set of bits from the I/O Controller 371 via the Cache Input/Output Control Bus 373.

The set of corresponding Auxiliary Input Buses 375,377 for each Two Stage Processor 345,347,349 is driven by either an Auxiliary Data Look-Up Table (LUT) 379,381 or directly from the Microstore 351. FIG. 10 shows two Auxiliary Data LUTs 379,381, which are controlled by bits from the Microstore 351.

The address of the Microstore 351 comes from the Microsequencer 383 via the Microstore Address Bus 385. The Microsequencer 383, in turn, receives its instructions from the Microstore 351 via the Microsequencer Instruction Bus 387. Both the Microsequencer 383 and the I/O Controller 371 receive control signals via the External Control Bus 389.

When particular embodiments of the SIMD architecture and the Two Stage Processor 345,347,349 are considered for implementation, the number and type of AUs in each stage must be chosen. Also, the appropriate number of Auxiliary Input Buses 341,343 must be included. There is a trade off between the number of Two Stage Processors 345,347,349 and the complexity of the Two Stage Processor 345,347,349.

DETAILED DESCRIPTIONS OF PREFERRED EMBODIMENTS

Many specific Two Stage Processor architectures are possible, hence, a preferred embodiment is presented to illustrate possible choices of AUs and multiport RAM configurations. The following preferred embodiments of the Two Stage Processor have been developed for image processing, with special attention to computation of motion vectors.

Architecture with Two Adders and a Multiply-Accumulate

Figure 11:
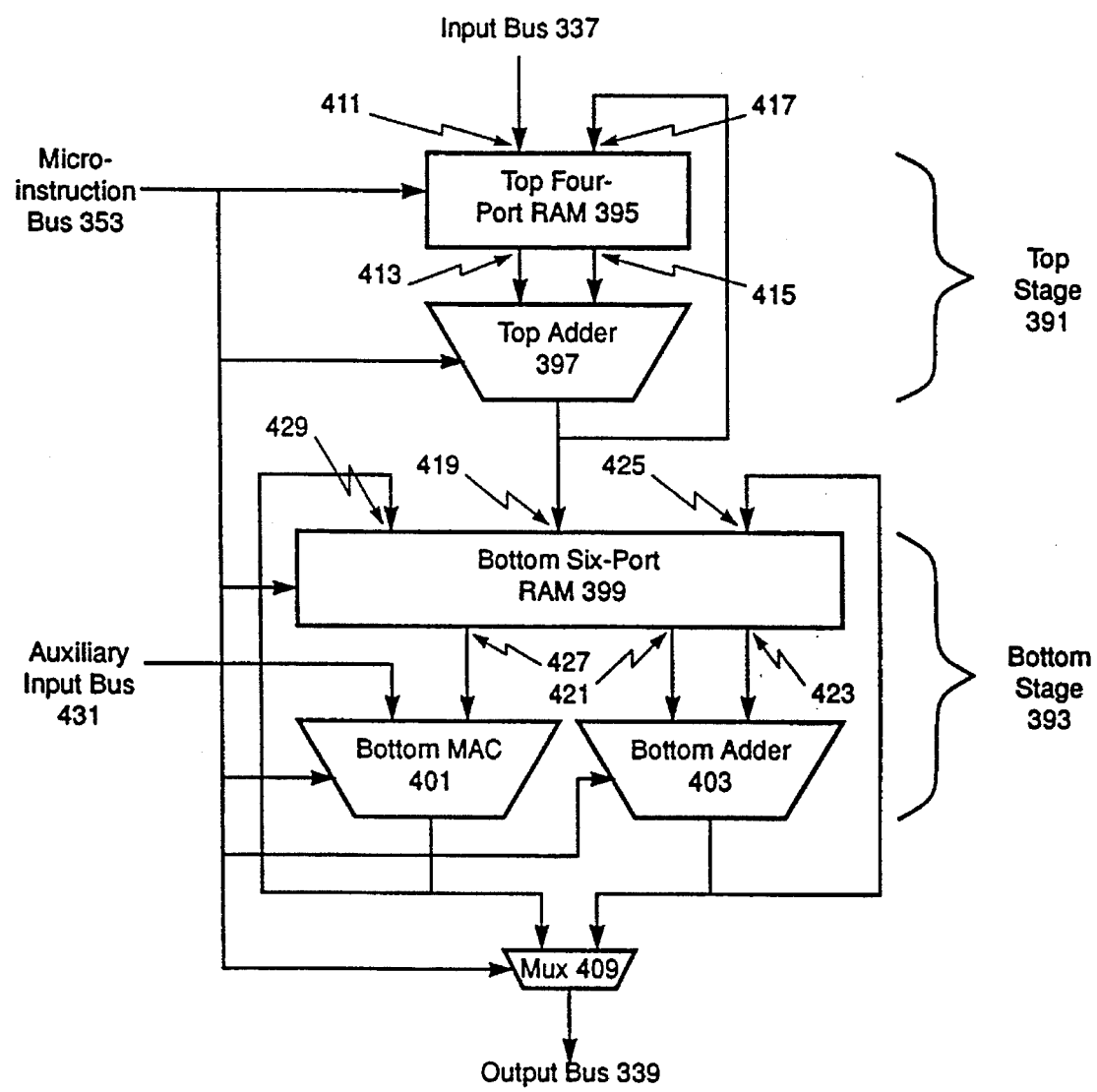
FIG. 11: A particular Two Stage Processor architecture utilizing parallel multiport memories. The Top Stage consists of a four-port RAM and an adder. The Bottom Stage consists of a six-port RAM, a multiply-accumulator, and an adder.

The overview block diagram of the particular Two Stage Processor architecture within the scope of the present patent is shown in FIG. 11. The architecture can be viewed as two cascaded stages: the Top Stage 391 and the Bottom Stage 393. The Top Stage 391 consists of the Top Four-Port RAM 395 and The Top Adder 397. The Bottom Stage 393 consists of the Bottom Six-Port RAM 399, the Bottom Multiply-Accumulator 401, and the Bottom Adder 403. The Input Bus 337 supplies data to the Processor by inputting data into the Top Four-Port RAM 395. The Output Bus 339 of the Processor is driven by a Multiplexor 409 which chooses between the output of the Bottom Multiply-Accumulator 401 and the output of the Bottom Adder 403.

The two multiport RAMs 395,399 of FIG. 11 simultaneously perform ten RAM accesses. More specifically, the ten accesses are: 1) a write access 411 to the Top Four-Port RAM 395 from the Input Bus 337; 2) a read access 413 from the Top Four-Port RAM 395 for the first operand for the Top Adder 397; 3) a read access 415 from the Top Four-Port RAM 395 for the second operand for the Top Adder 397; 4) a write access 417 to the Top Four-Port RAM 395 from the output of the Top Adder 397; 5) a write access 419 to the Bottom Six-Port RAM 399 from the output of the Top Adder 397; 6) a read access 421 from the Bottom Six-Port RAM 399 for the first operand for the Bottom Adder 403; 7) a read access 423 from the Bottom Six-Port RAM 399 for the second operand for the Bottom Adder 403; 8) a write access 425 to the Bottom Six-Port RAM 399 from the output of the Bottom Adder 403; 9) a read access 427 from the Bottom Six-Port RAM 399 for the second operand for the Bottom Multiply-Accumulator 401; and 10) a write access 429 to the Bottom Six-Port RAM 399 from the output of the Bottom Multiply-Accumulator 401. For independent control of these ten RAM accesses 411,413,415,417,419,421,423,425,427, 429, ten addresses and five write enable signals must be supplied by the Microinstruction Bus 353. The Microinstruction 353 Bus also supplies: i) the type of operations for the two adders, 397,403 namely, add, subtract, or pass data; and ii) the type of operation for the multiplier 401, namely, accumulate or not accumulate; and iii) the Output Multiplexor 409 select bit. The Microinstruction Bus 353 is shown explicitly in FIG. 10 and FIG. 11, but for clarity, the Microinstruction Bus 353 is not shown in the other figures and is assumed to connect to all RAMs, AUs, Muxes, etc. in each Two Stage Processor.

Also included in the architecture of FIG. 11 is one Auxiliary Input Bus 431 for supplying the first Bottom Multiply-Accumulate 401 operand. In practice, an additional multiplexor could be added to the architecture to select between the Auxiliary Input Bus 431 and the second Bottom Multiply-Accumulate 401 operand; thus allowing the microcode to either multiply a number read from the Bottom Six-Port RAM 399 by an external coefficient supplied by the Auxiliary Input Bus 431 or to square the number read from the Bottom Six-Port RAM 399. The Output Bus 339 is driven by an Output Multiplexor 409, which selects between the output of the Bottom Multiply-Accumulator 401 and the output of the Bottom Adder 403.

Inclusion of Complex Numbers

The square root of $-1$ is normally shown mathematically by $\sqrt{-1}$ and represented by the symbol j. Notation for a single complex number is a+jb, where a is the real part of the complex number and b is the imaginary part of the complex number. Hence, in computation hardware, two numbers are required to store the value of a single complex number.

Figure 12:
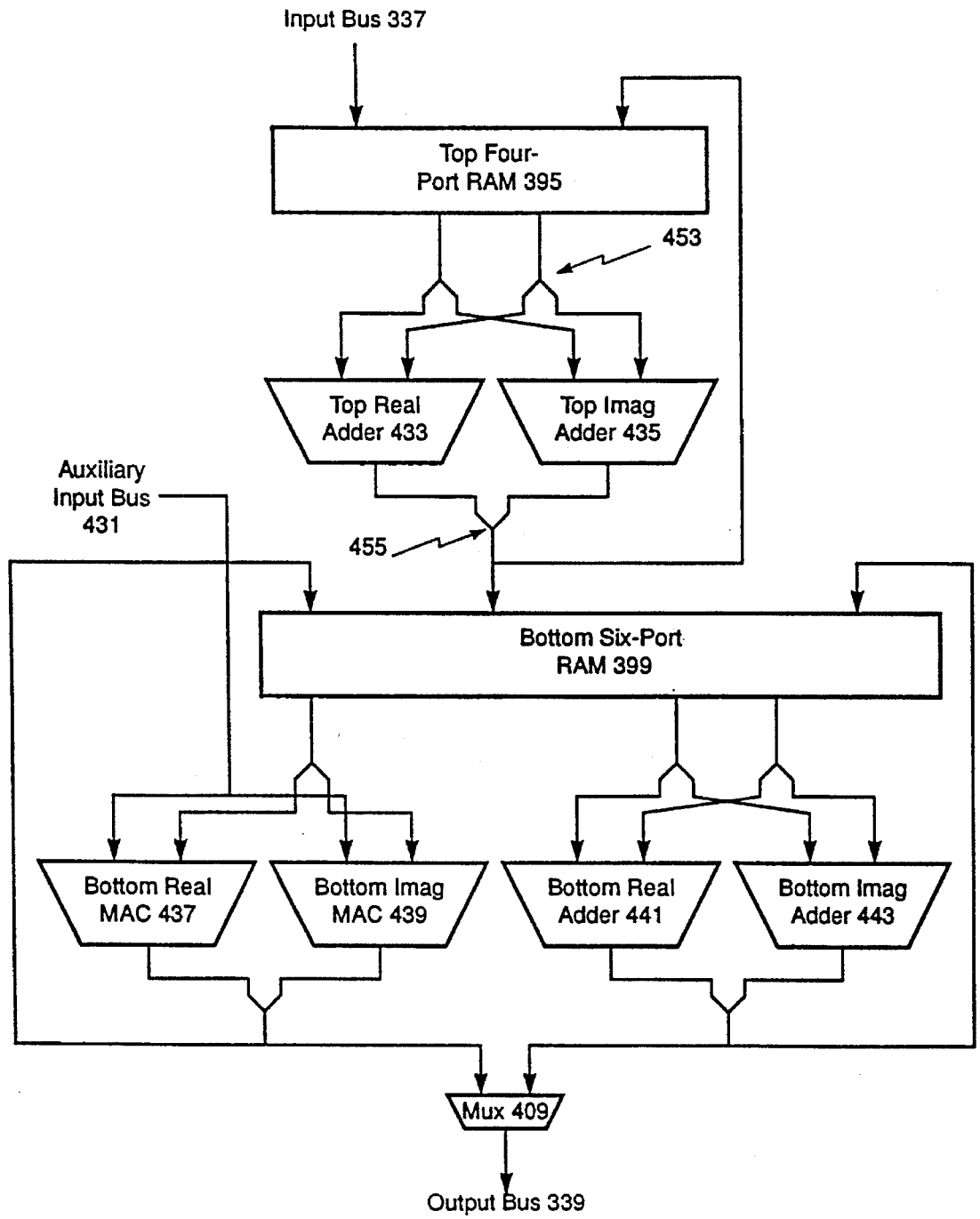
FIG. 12: Two Stage Processor Architecture similar to that of FIG. 11 except the number of Arithmetic Units has been doubled in order to allow direct manipulation of complex numbers.

The computational ability of the FIG. 11 architecture can be increased without increasing the number of read ports or write ports on the multiport RAMs 395,399 by storing two numbers in each multiport RAM location and doubling the number of AUs 397,401,403. It is important to keep the number of multiport RAM read ports and write ports to a minimum because it is important to keep the number of bits in the Microinstruction Bus 353 to a minimum. Such an architecture is illustrated in FIG. 12. Hence, the Top Adder 397 is replaced by the Top Real Adder 433 and the Top Imaginary Adder 435; the Bottom Multiply-Accumulate 401 is replaced by the Bottom Real Multiply-Accumulate (abbreviated MAC) 437 and the Bottom Imaginary Multiply-Accumulate 439; and the Bottom Adder 403 is replaced by the Bottom Real Adder 441 and the Bottom Imaginary Adder 443. The restriction of requiring two numbers to be stored in the same location is not overly restrictive if either: i) complex numbers are being manipulated; or ii) two sets of data are processed in parallel by the same Two Stage Processor 345,347,349. In FIG. 12, if complex numbers are being manipulated, both halves of all complex numbers are processed in parallel. The architecture of FIG. 12 is not a fully complex version of FIG. 11 because the Auxiliary Input Bus 431 is used for real numbers, not complex numbers. The architecture of FIG. 11 could be made fully complex by changing all data buses, including the Auxiliary Input Bus 431, to complex buses and by changing all AUs 397,401,403 to handle complex numbers on all their inputs.

In the figures, when a data bus splits into two buses (for example, one 32-bit bus splitting into two 16-bit buses), a "demerge" symbol 453 is used; and when two buses become unified into one bus, a "merge" symbol 455 is used. In FIG. 12, both the Input Bus 337 and the Output Bus 339 are used to transfer complex numbers.

Inclusion of Multiply by $\sqrt{-1}$ in Arithmetic Units

The process of multiplying a complex number by $\sqrt{-1}$, or j, can be done by swapping the real part of the complex number with the imaginary part and reversing the arithmetic sign of the new real pan. Mathematically, this is j (a+jb)=−b+ja.

Figure 13:
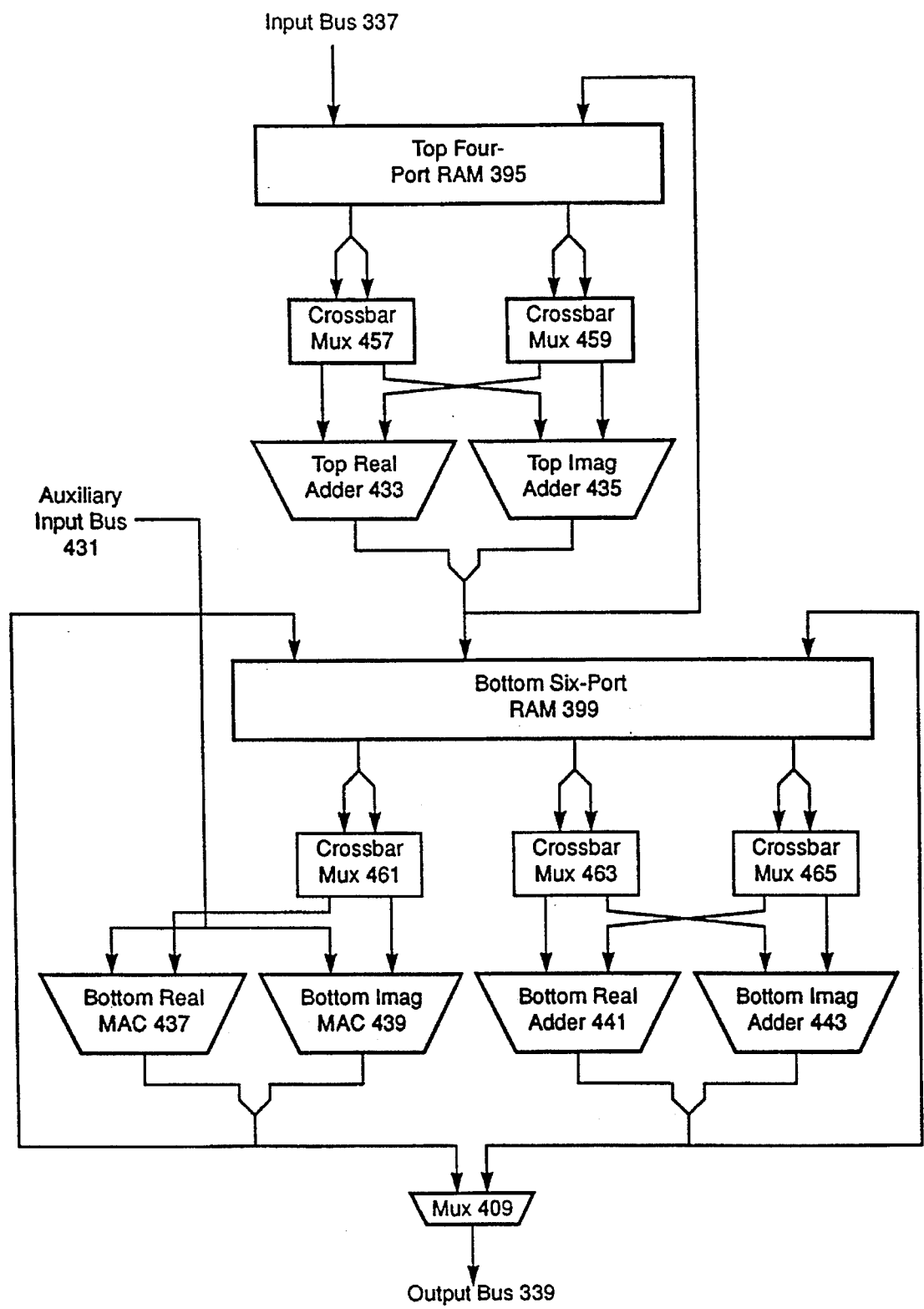
FIG. 13: Two Stage Processor Architecture similar to that of FIG. 12 except a Crossbar Multiplexor has been inserted after the all output buses for both multiport memories. These Crossbar Multiplexors allow swapping the real and imaginary parts of complex numbers before they are input to an Arithmetic Unit.

The architecture of FIG. 13 adds the capability of multiplying any AU operand by j by: i) adding Crossbar Multiplexors 457,459,461,463,465 after the read ports of the multiport RAMs 395,399, thereby optionally swapping the real and imaginary pans of a complex number; and ii) modifying the control bits supplied by the Microinstruction Bus 353 to the adders 433,435,441,443 and multipliers 437,439 to account for the arithmetic sign change. In FIG. 13, an AU may be considered to include both a Crossbar Multiplexor 457,459,461,463,465 and either an adder 433, 435,441,443 or multiplier 437,439. In practice, since addition and multiplication are commutative (that is, a+b=b+a and ab=ba), only one Crossbar Mux could be required per pair of AUs (pairs are: 433 and 435; 437 and 439; 441 and 443) because many elementary subroutines can be written to require only one of the two operands to an adder or multiplier to be multiplied by j.

Reduction in the Number of Multipliers

Figure 14:
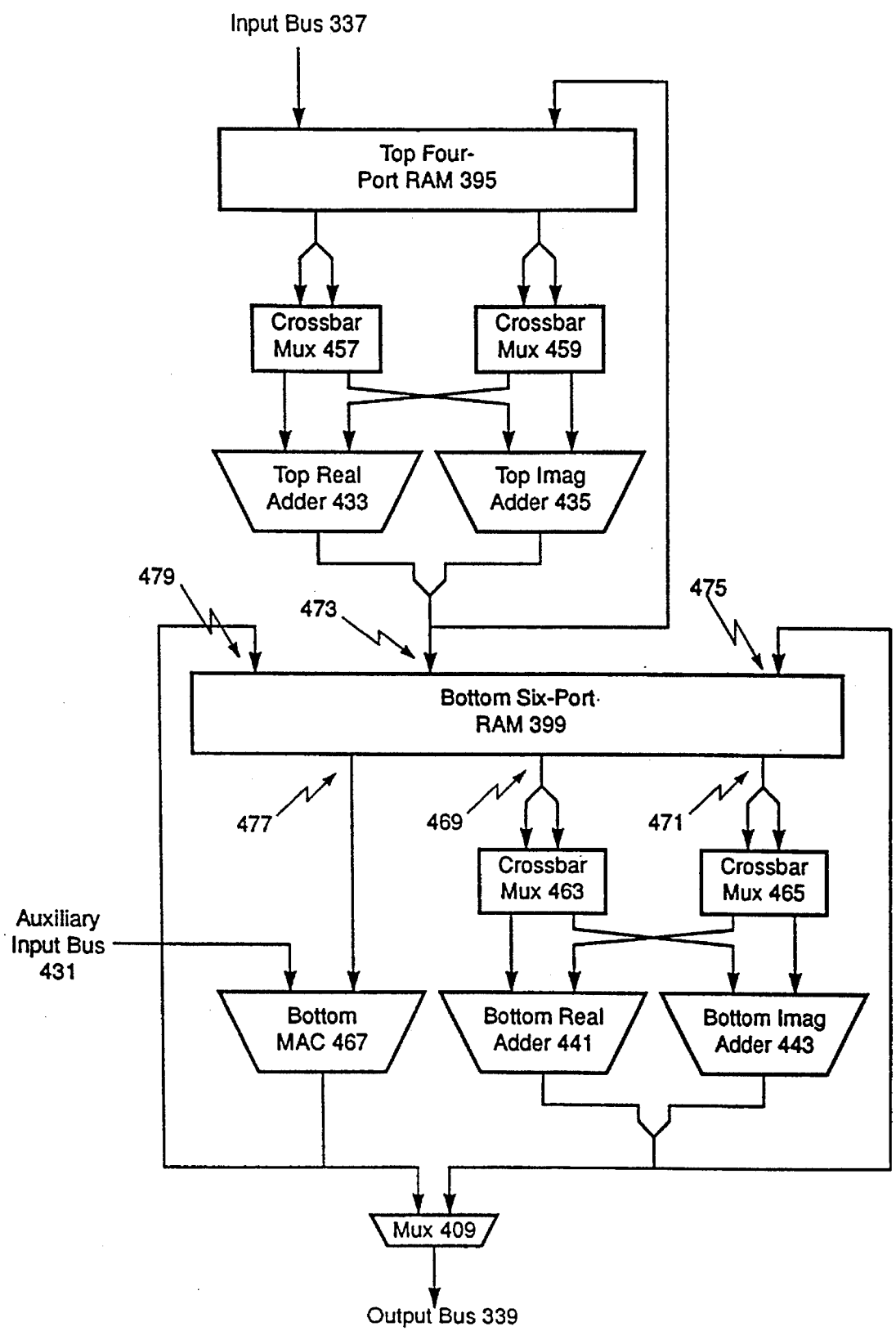
FIG. 14: Two Stage Processor Architecture similar to that of FIG. 13 except only one multiply-accumulator is included. If complex numbers are processed, the single multiply-accumulator, real and imaginary parts are multiplied sequentially.

In FIG. 14, a Two Stage Processor architecture is shown with only one Multiply-Accumulate 467, which is otherwise identical to that of FIG. 13. Since MAC functions are relatively expensive to implement, it is useful to reduce the number of MACs. Because of this fact, elementary subroutines are usually designed to minimize the number of required multiplies. A ratio of 4-to-1 between adds and multiply-accumulates can be achieved for many elementary subroutines of interest. In the architecture of FIG. 14, the Bottom Six-Port RAM 399 has: i) two read ports 469,471 for complex numbers; ii) two write ports 473,475 for complex numbers; iii) one read port 477 for real numbers; and iv) one write port 479 for real numbers. For items iii and iv, the Bottom Six-Port RAM 399 must be able to separately read and write the real and imaginary parts of stored complex numbers. Hence, the Bottom Six-Port RAM 399 in FIG. 14 must has four write enables rather than three.

Figure 15:
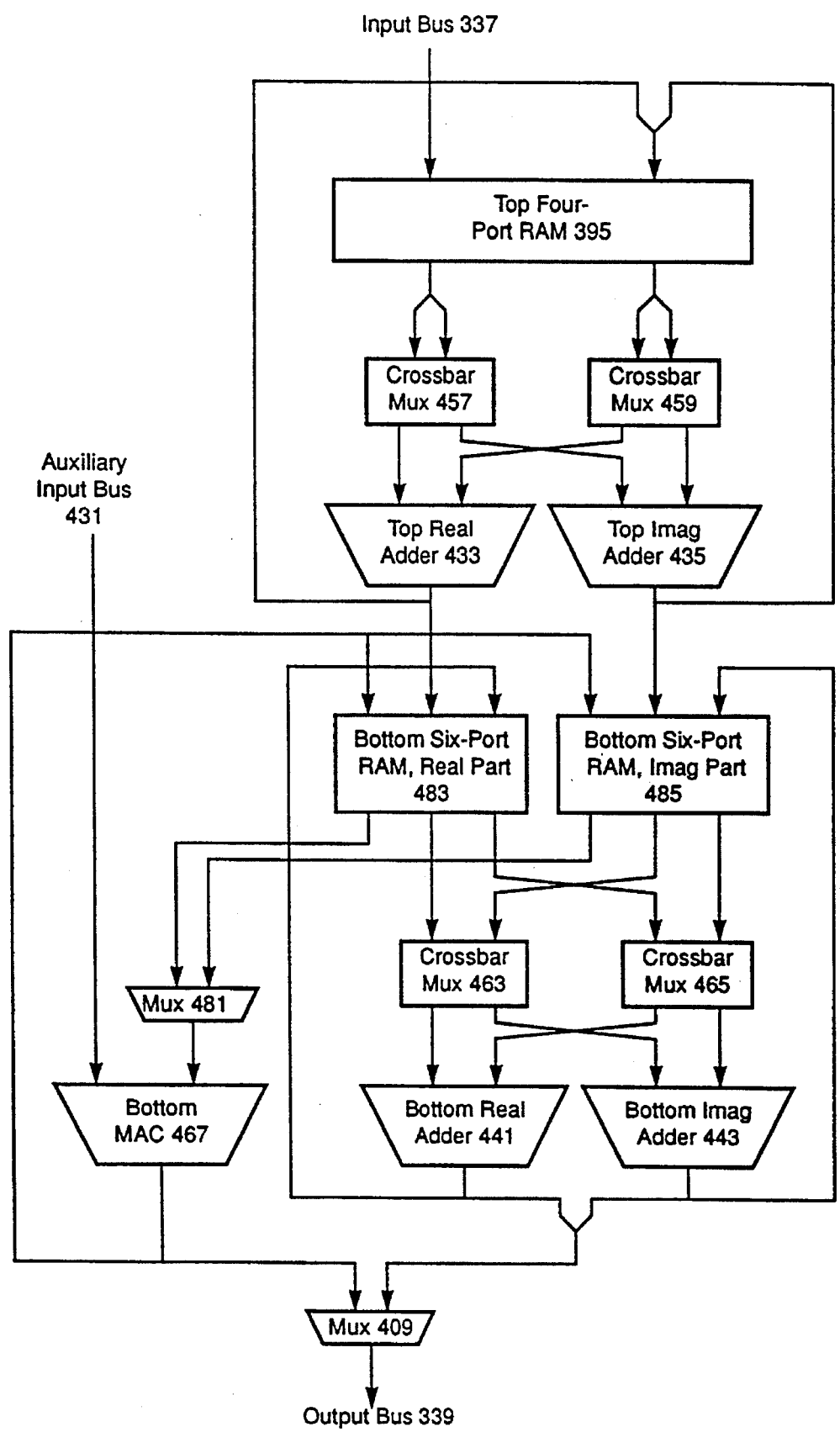
FIG. 15: Two Stage Processor Architecture similar to that of FIG. 14 except the six-port RAM has implemented with two separate RAM arrays: one RAM array for the real part and one RAM array for the imaginary part.

Since the Bottom Six-Port RAM 399 of FIG. 14 might be difficult to build, an alternative is presented in FIG. 15. The Bottom Six-Port RAM 399 is implemented with a Multiplexor 481 and two six-port RAMs 483,485: the Bottom Six-Port RAM, Real Part 483; and the Bottom Six-Port RAM, Imaginary Part 485. Four write enable signals must still be supplied, but two are shared by both RAMs 483,485.

Inclusion of Scale Factors in the AUs

In many elementary subroutines, arithmetic scale factors which are integer powers of 2 are included. For example, an operation such as z=x+2y or z=x+y/2 can be done with an adder if it includes a scale factor capability. Another reason to include such scale factors is to account for different decimal positions in multiplier coefficients supplied by the Auxiliary Input Bus 431.

Figure 16:
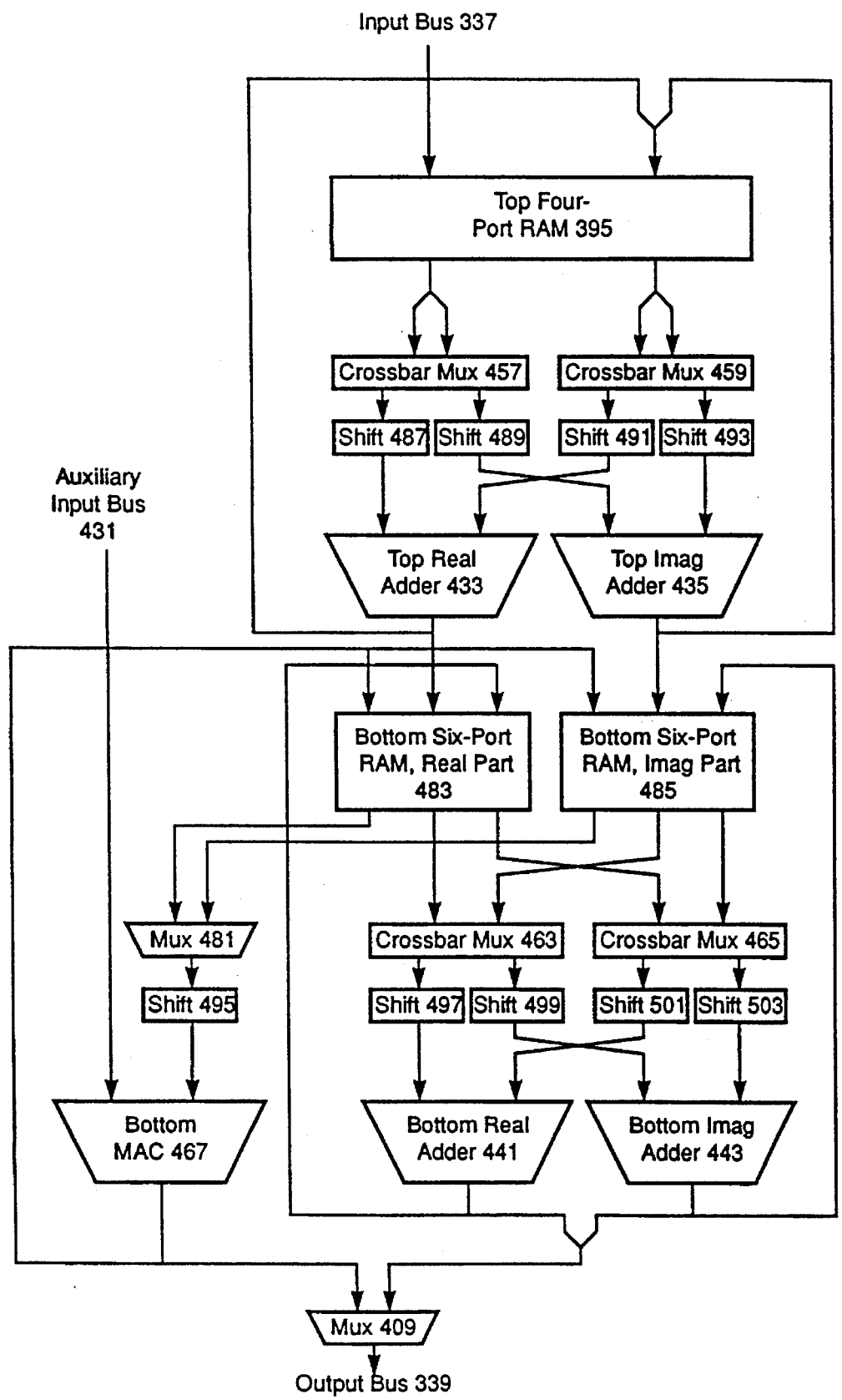
FIG. 16: Two Stage Processor Architecture similar to that of FIG. 15 except a shifter has been added to the input of Arithmetic Units.

In FIG. 16, Shifters 487,489,491,493,495,497,499,501, 503 have been added before the input of each AU 433,435, 441,443,467. These Shifters 487,489,491,493,495,497,499, 501,503 can be designed to do fight arithmetic shifts and/or left arithmetic shifts. If the AUs 433,435,441,443,467 are using floating point representation, the Shifter 487,489,491, 493,495,497,499,501,503 becomes an adder which is only applied to the exponent. In practice, since addition and multiplication are commutative, only one Shifter could be required per pair of AUs (pairs are: 433 and 435; 437 and 439; 441 and 443) because many elementary subroutines can be written to require only one of the two operands to an adder or multiplier to be scaled. Additionally, a shifter could be placed after the Output Multiplexor 409 in order scale the output as needed.

Dual Multipliers, Multiplication by $\sqrt{-1}$, and Scale Factors

Figure 17:
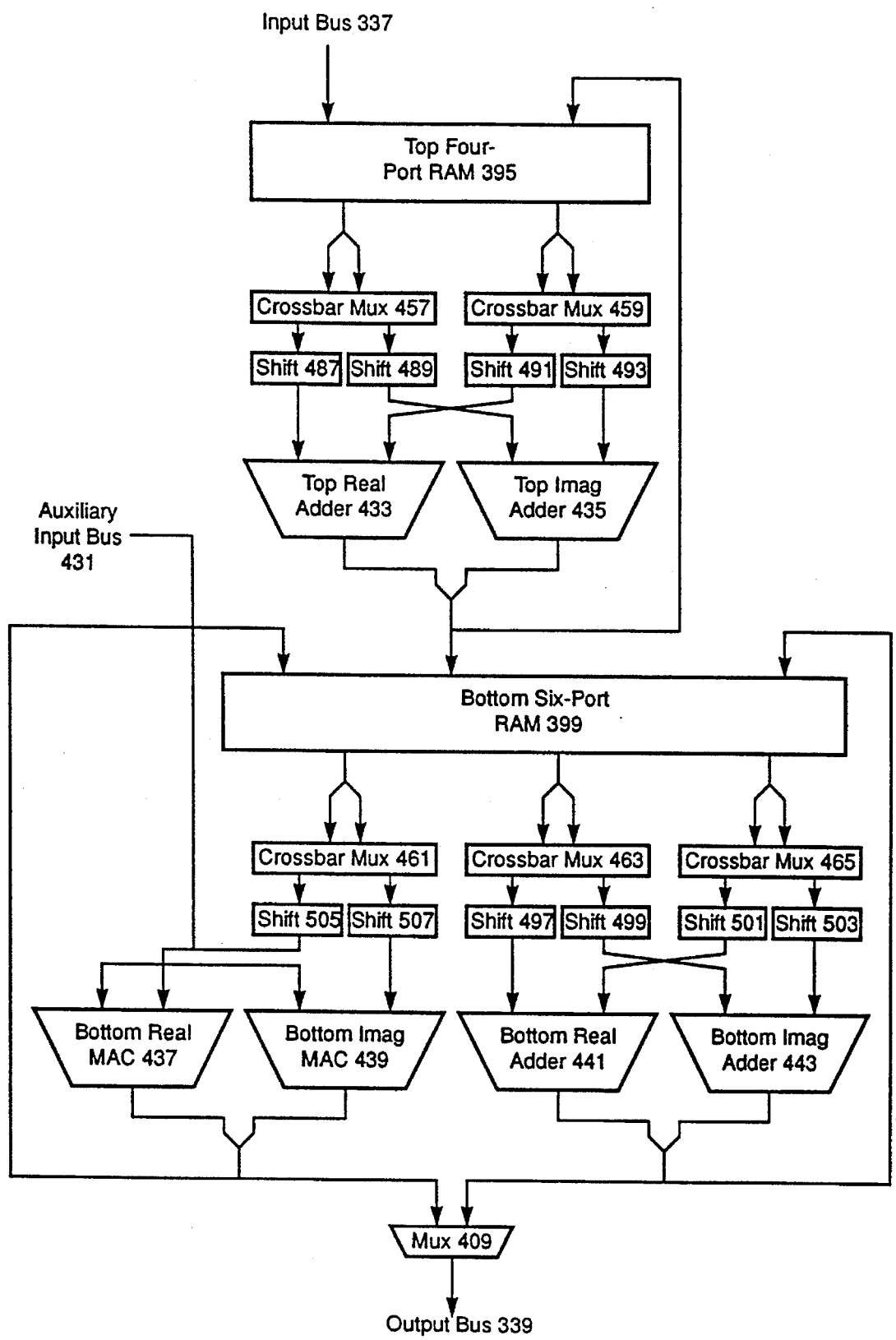
FIG. 17: Two Stage Processor Architecture similar to that of FIG. 13 except a crossbar multiplexor and a shifter have been added to the input of Arithmetic Units.

If the features of multiplying by $\sqrt{-1}$, or j, and scale factors are added directly to the architecture of FIG. 13, the architecture of FIG. 17 results. This is also equivalent to the architecture of FIG. 16 where two multiply-accumulators 437,439 are included. Because there are two MACs 437,439, there must also be two Shifters 505,507.

Computation of Transforms

The above architectures are intended to perform the cross correlation computation on blocks of data. A key portion of this computation is done with DFTs, which can, in turn, be efficiently computed with Short Length Transforms (SLTs). To provide an example of an SLT for further discussion, the set of operations for a 16-point transform are labeled Equation 8 through Equation 13. Each of these "equations" is actually a set of simple equations which could be performed by the same AU within a Two Stage Processor.

The input data vector for this 16-point SLT is complex, $x_k = x_{kr} + jx_{ki}$, $k=0, \ldots, 15$, where $x_{kr}$ is the real part denoted with the subscript "r" and $x_{kr}$ is the imaginary part denoted with the subscript "i". If the architecture of FIG. 13 is utilized, then all the operations within Equation 8 would be performed in the Top Real Adder 433.

used on the right side of equations in either Equation 8 or Equation 9. For example, $t_{2r}$ is generated by the equation $t_{2r} = x_{4r} + x_{12r}$, but is used in the equation $t_{15r} = t_{1r} + t_{2r}$ and $t_{30r} = t_{1r} - t_{2r}$ to generate $t_{15r}$ and $t_{30r}$.

All the operations within Equation 10 would be performed in the Bottom Real Multiply-Accumulate 437, while all the operations within Equation 11 would be performed in the Bottom Imaginary Multiply-Accumulate 439.

$$m_{0r} = t_{32r}\cos(2\theta) \qquad m_{1r} = t_{33r}\cos(2\theta) \qquad \text{(EQ 10)}$$
$$m_{2r} = t_{34r}\cos(3\theta) \qquad m_{3r} = t_{24r}(\cos(\theta) + \cos(3\theta))$$
$$m_{4r} = t_{26r}(\cos(3\theta) - \cos(\theta)) \qquad m_{5r} = t_{38i}\sin(2\theta)$$
$$m_{6r} = t_{39i}\sin(2\theta) \qquad m_{7r} = t_{40i}\sin(3\theta)$$
$$m_{8r} = -t_{23i}(\sin(3\theta) - \sin(\theta)) \qquad m_{9r} = t_{25i}(\sin(\theta) + \sin(3\theta))$$
$$m_{0i} = t_{32i}\cos(2\theta) \qquad m_{1i} = t_{33i}\cos(2\theta) \qquad \text{(EQ 11)}$$
$$m_{2i} = t_{34i}\cos(3\theta) \qquad m_{3i} = t_{24i}(\cos(\theta) + \cos(3\theta))$$
$$m_{4i} = t_{26i}(\cos(3\theta) - \cos(\theta)) \qquad m_{5i} = t_{38r}\sin(2\theta)$$
$$m_{6i} = t_{39r}\sin(2\theta) \qquad m_{7i} = t_{40r}\sin(3\theta)$$
$$m_{8i} = -t_{23r}(\sin(3\theta) - \sin(\theta)) \qquad m_{9i} = t_{25r}(\sin(\theta) + \sin(3\theta))$$

In Equation 10 and Equation 11, $\theta = 2\pi/16$. Constants, such as $\cos(3\theta) - \cos(\theta)$, are supplied by the Auxiliary Input Bus 431. In some of the operations listed within Equation 10 and Equation 11, such as $m_{5r} = t_{38i}\sin(2\theta)$, an imaginary part of a number, in this case $t_{38i}$, is used to generate the real part of another number, in this case $m_{5r}$. The same situation occurs for the respective imaginary and real parts, namely $t_{38r}$ and $m_{5i}$. When this type of pair of operations are required, the Crossbar Multiplexor 461 swaps the real and imaginary parts of the number read from the Bottom Six-Port RAM 399 before it reaches the multipliers 437,439.

$$
\begin{aligned}
&t_{1r} = x_{0r} + x_{8r} & &t_{2r} = x_{4r} + x_{12r} & &t_{3r} = x_{2r} + x_{10r} & &t_{4r} = x_{2r} - x_{10r} & &\text{(EQ 8)}\\
&t_{5r} = x_{6r} + x_{14r} & &t_{6r} = x_{6r} - x_{14r} & &t_{7r} = x_{1r} + x_{9r} & &t_{8r} = x_{1r} - x_{9r} \\
&t_{9r} = x_{3r} + x_{11r} & &t_{10r} = x_{3r} - x_{11r} & &t_{11r} = x_{5r} + x_{13r} & &t_{12r} = x_{5r} - x_{13r} \\
&t_{13r} = x_{7r} + x_{15r} & &t_{14r} = x_{7r} - x_{15r} & &t_{15r} = t_{1r} + t_{2r} & &t_{16r} = t_{3r} + t_{5r} \\
&t_{17r} = t_{15r} + t_{16r} & &t_{18r} = t_{7r} + t_{11r} & &t_{19r} = t_{7r} - t_{11r} & &t_{20r} = t_{9r} + t_{13r} \\
&t_{21r} = t_{9r} - t_{13r} & &t_{22r} = t_{18r} + t_{20r} & &t_{23r} = t_{8r} + t_{14r} & &t_{24r} = t_{8r} - t_{14r} \\
&t_{25r} = t_{10r} + t_{12r} & &t_{26r} = t_{12r} - t_{10r} & &t_{27r} = t_{17r} + t_{22r} & &t_{28r} = t_{17r} - t_{22r} \\
&t_{29r} = t_{15r} - t_{16r} & &t_{30r} = t_{1r} - t_{2r} & &t_{31r} = x_{0r} - x_{8r} & &t_{32r} = t_{19r} - t_{21r} \\
&t_{33r} = t_{4r} - t_{6r} & &t_{34r} = t_{24r} + t_{26r} & &t_{35r} = t_{20r} - t_{18r} & &t_{36r} = t_{5r} - t_{3r} \\
&t_{37r} = x_{12r} - x_{4r} & &t_{38r} = t_{19r} + t_{21r} & &t_{39r} = t_{4r} + t_{6r} & &t_{40r} = t_{23r} + t_{25r} \\
\\
&t_{1i} = x_{0i} + x_{8i} & &t_{2i} = x_{4i} + x_{12i} & &t_{3i} = x_{2i} + x_{10i} & &t_{4i} = x_{2i} - x_{10i} & &\text{(EQ 9)}\\
&t_{5i} = x_{6i} + x_{14i} & &t_{6i} = x_{6i} - x_{14i} & &t_{7i} = x_{1i} + x_{9i} & &t_{8i} = x_{1i} - x_{9i} \\
&t_{9i} = x_{3i} + x_{11i} & &t_{10i} = x_{3i} - x_{11i} & &t_{11i} = x_{5i} + x_{13i} & &t_{12i} = x_{5i} - x_{13i} \\
&t_{13i} = x_{7i} + x_{15i} & &t_{14i} = x_{7i} - x_{15i} & &t_{15i} = t_{1i} + t_{2i} & &t_{16i} = t_{3i} + t_{5i} \\
&t_{17i} = t_{15i} + t_{16i} & &t_{18i} = t_{7i} + t_{11i} & &t_{19i} = t_{7i} - t_{11i} & &t_{20i} = t_{9i} + t_{13i} \\
&t_{21i} = t_{9i} - t_{13i} & &t_{22i} = t_{18i} + t_{20i} & &t_{23i} = t_{8i} + t_{14i} & &t_{24i} = t_{8i} - t_{14i} \\
&t_{25i} = t_{10i} + t_{12i} & &t_{26i} = t_{12i} - t_{10i} & &t_{27i} = t_{17i} + t_{22i} & &t_{28i} = t_{17i} - t_{22i} \\
&t_{29i} = t_{15i} - t_{16i} & &t_{30i} = t_{1i} - t_{2i} & &t_{31i} = x_{0i} - x_{8i} & &t_{32i} = t_{19i} - t_{21i} \\
&t_{33i} = t_{4i} - t_{6i} & &t_{34i} = t_{24i} + t_{26i} & &t_{35i} = t_{20i} - t_{18i} & &t_{36i} = t_{5i} - t_{3i} \\
&t_{37i} = x_{12i} - x_{4i} & &t_{38i} = t_{19i} + t_{21i} & &t_{39i} = t_{4i} + t_{6i} & &t_{40i} = t_{2i} + t_{25i}
\end{aligned}
$$

Analogously, all the operations within Equation 9 would be performed in the Top Imaginary Adder 435. In both Equation 8 and Equation 9 the set of the first intermediate results, labeled $t_{1r}$ through $t_{40r}$ and $t_{1i}$ through $t_{40i}$, are stored in pairs as complex numbers in either the Top Four-Port RAM 395 or the Bottom Six-Port RAM 399. These results are only stored into the Top Four-Port RAM 395 if they are This, in effect, coupled with appropriate arithmetic sign changes, multiplies numbers by j.

All the operations within Equation 12 would be performed in the Bottom Real Adder 441, while all the operations within Equation 13 would be performed in the Bottom Imaginary Adder 443.

$$s_{1r} = t_{30r} + m_{0r} \quad s_{2r} = t_{30r} - m_{0r} \quad s_{3r} = t_{38r} - t_{36i} \quad s_{4r} = -t_{38r} - t_{36i} \quad \text{(EQ 12)}$$
$$s_{5r} = t_{31r} + m_{1r} \quad s_{6r} = t_{31r} - m_{1r} \quad s_{7r} = m_{3r} - m_{2r} \quad s_{8r} = m_{4r} - m_{2r}$$
$$s_{9r} = s_{5r} + s_{7r} \quad s_{10r} = s_{5r} - s_{7r} \quad s_{11r} = s_{6r} + s_{8r} \quad s_{12r} = s_{6r} - s_{8r}$$
$$s_{13r} = m_{6r} - t_{37i} \quad s_{14r} = -m_{6r} - t_{37i} \quad s_{15r} = m_{7r} + m_{8r} \quad s_{16r} = m_{7r} - m_{9r}$$
$$s_{17r} = s_{13r} + s_{15r} \quad s_{18r} = s_{13r} - s_{15r} \quad s_{19r} = s_{14r} + s_{16r} \quad s_{20r} = s_{14r} - s_{16r}$$
$$X_{0r} = m_{0r} \quad X_{1r} = s_{9r} + s_{17r} \quad X_{2r} = s_{1r} + s_{3r} \quad X_{3r} = s_{12r} - s_{20r}$$
$$X_{4r} = t_{29r} - t_{35i} \quad X_{5r} = s_{11r} + s_{19r} \quad X_{6r} = s_{2r} + s_{4r} \quad X_{7r} = s_{10r} - s_{18r}$$
$$X_{8r} = t_{28r} \quad X_{9r} = s_{10r} + s_{18r} \quad X_{10r} = s_{2r} - s_{4r} \quad X_{11r} = s_{11r} - s_{19r}$$
$$X_{12r} = t_{29r} + t_{35i} \quad X_{13r} = s_{12r} + s_{20r} \quad X_{14r} = s_{1r} - s_{3r} \quad X_{15r} = s_{9r} - s_{17r}$$

$$s_{1i} = t_{30i} + m_{0i} \quad s_{2i} = t_{30i} - m_{0i} \quad s_{3i} = t_{38i} - t_{36i} \quad s_{4i} = t_{36r} - t_{38i} \quad \text{(EQ 13)}$$
$$s_{5i} = t_{31i} + m_{1i} \quad s_{6i} = t_{31i} - m_{1i} \quad s_{7i} = m_{3i} - m_{2i} \quad s_{8i} = m_{4i} - m_{2i}$$
$$s_{9i} = s_{5i} + s_{7i} \quad s_{10i} = s_{5i} - s_{7i} \quad s_{11i} = s_{6i} + s_{8i} \quad s_{12i} = s_{6i} - s_{8i}$$
$$s_{13i} = m_{6i} - t_{37r} \quad s_{14i} = t_{37r} - m_{6i} \quad s_{15i} = m_{7i} + m_{8i} \quad s_{16i} = m_{7i} - m_{9i}$$
$$s_{17i} = s_{13r} + s_{15r} \quad s_{18i} = s_{13r} - s_{15r} \quad s_{19i} = s_{14r} + s_{16r} \quad s_{20i} = s_{14r} - s_{16r}$$
$$X_{0i} = m_{0i} \quad X_{1i} = s_{9i} + s_{17i} \quad X_{2i} = s_{1i} + s_{3i} \quad X_{3i} = s_{12i} - s_{20i}$$
$$X_{4i} = t_{29i} - t_{35r} \quad X_{5i} = s_{11i} + s_{19i} \quad X_{6i} = s_{2i} + s_{4i} \quad X_{7i} = s_{10i} - s_{18i}$$
$$X_{8i} = t_{28i} \quad X_{9i} = s_{10i} + s_{18i} \quad X_{10i} = s_{2i} - s_{4i} \quad X_{11i} = s_{11i} - s_{19i}$$
$$X_{12i} = t_{29i} + t_{35r} \quad X_{13i} = s_{12i} + s_{20i} \quad X_{14i} = s_{1i} - s_{3i} \quad X_{15i} = s_{9i} - s_{17i}$$

The output data vector for this 16-point SLT is complex, $X_k = X_{kr} + jX_{ki}$, k=0, ..., 15. The Crossbar Multiplexors 463,465 are used to swap inputs for operations such as: $s_{3r} = t_{38r} - t_{36i}$ and $s_{3i} = t_{36r} + t_{38i}$. In none of the equations is there a situation where two imaginary parts of numbers are added to make a real part of a number, thus, one of the Crossbar Multiplexors 463,465 could be removed from the architecture. However, removing a Crossbar Multiplexors 463,465 must be done with care, as some other elementary subroutine may need both Crossbar Multiplexors 463,465.

In all the 16-point SLT operations, there are: 80 adds which take place in the Top Real Adder 433 and the Top Imaginary Adder 435; 20 multiplies which take place in the Bottom Real Multiply-Accumulate 437 and the Bottom Imaginary Multiply-Accumulate 439; and 72 adds which take place in the Bottom Real Adder 441 and the Bottom Imaginary Adder 443. If this 16-point SLT were performed many consecutive times, the multipliers 437,439 would be underutilized. This is why the architecture of FIG. 14 is attractive; it eliminates an expensive component: a multiplier.

If the input data vector contains zeros the number of operations can be further reduced. For example, if $x_k \neq 0$ for k=0, ..., 7 but $x_k = 0$ for k=8, ..., 15, then a special 16-point zero-padded SLT can be developed. In this case, all the operations in Equation 8 and Equation 9 contributed by $x_k = 0$ for k=8, ..., 15 can either be eliminated or simplified. This innovation is applied to Steps 6 131 and 7 133 in FIG. 6 and Steps 6 227 and 8 235 in FIG. 7 but with a 32-point SLT. A similar simplification can be carried through Equation 12 to Equation 13, if a part of output vector is not needed or discarded, they don't have to be computed. For example, if $X_k$ for k=8, ..., 15 are discarded, then operations that compute these outputs can be eliminated from Equation 12 and Equation 13. This innovation is applied to Step 13 159 in FIG. 6 and Step 13 255 in FIG. 7 but with a 32-point SLT. These special SLTs amount to about 25% saving in computation for some transforms.

The operations for the above 16-point SLT example must be scheduled on an architecture when the architecture is implemented. That is, each operation must be scheduled to occur at a specific time in the hardware, and, the storage location of results of all operations must also be scheduled. In general, a schedule for an architecture and a particular set of equations can be generated as follows: 1) sort the equations according to which AU will perform them; 2) for each AU, sort its equations in precedence order, that is, equations which use results from other equations are put at the end of such a list; 3) generate a two-dimensional matrix with one row per equation for all equations and one column per clock period, that is, equation results on the vertical axis and time on the horizontal axis; 4) starting with the first equation in the precedence list for the first AU, put an "X" in the equation versus time matrix where the AU finishes the computation for that equation, and proceed to the rest of the equations for all AUs (there should be only one "X" per row of the matrix and only one "X" per column for a particular AU); 5) as an "X" is placed, care must be taken to make sure the inputs to the equation under consideration are available from a multiport memory 115,117, it is necessary to place an "X" further to the right if its equation's inputs are not available until that clock cycle, this will leave vacant clock cycles for some AUs which will be filled by subsequent equations; 6) proceed until all equations have been scheduled, that is, each row of the matrix has an "X"; 7) if there are unoccupied clock cycles (column in the matrix) for an AU (which means a resource is not being fully used or partially wasted), "Xs" can be swapped in order to reduce the number of columns; 8) place a "Y" in each matrix location starting to the fight of each "X" and continue placing "Ys" until the last clock cycle for which the result of that equation is needed by any other equation, hence, each row should have one "X" followed by a contiguous set of "Ys"; 9) place "Ys" for all "Xs", the set of each "X" and "Ys" in a row show how long the result of an equation needs to be stored in a multiport RAM 115,117; 10) sets of "X" followed by "Ys" are now grouped together provided they do not share any columns and the value is stored in the same multiport RAM 115,117, these groups represent equation results which can be stored in the same location in the same multiport RAM 115,117; 11) the number of groups, for a particular multiport RAM 115,117, are the number of register locations required for that multiport RAM 115,117, these register locations are now assigned; and 12) the schedule is complete and is translated into the bits which need to loaded in the Microstore 351. This procedure for generating microcode can be mechanized by writing a computer program to do it. This would allow sophisticated techniques to be used, such as the "simulated annealing" algorithm to be used in step 7 described above.

Essentially the same scheduling algorithm can be used for looping on sets of equations. However, in this case, the equation versus time matrix must be viewed as periodic, and placing an "X" is actually placing an entire series of "Xs", one for each period of the loop.

Another class of elementary subroutine of interest to real-time video compression is the DCT. DCTs can be described by a set of equations similar to that of the above 16-point SLT example. However, many DCT equation sets include operations such as $u_0=n_0+2n_1$, which justifies the addition of Shifters 487,489,491,493,495,497,499,501,503, 505,507 to the architecture.

Computation of Cross Correlation—Method A 100

In FIG. 6, a set of procedures for Method A 100 are presented to show the sequence of computation on input data blocks. Without loss of generality, we denote a data block whose motion vector needs to be estimated to have a size of $N_1 \times N_2$ and a search block a size of $M_1 \times M_2$. Also, we restrict that $M_1 > N_1$ and $M_2 > N_2$. For simplicity of explanation, $M_1$, $M_2$, $N_1$, and $N_2$ are assumed to be even, but the method can be easily modified for non-even data block sizes. Accordingly, the cross-correlation in Equation 14 has the general form:

$$c(n, m) = \sum_{i=0}^{N_1-1} \sum_{l=0}^{N_2-1} x(i, l) y(i+n, l+m) \quad \text{(EQ 14)}$$

$$n = 0, \ldots, M_1 - N_1$$
$$m = 0, \ldots, M_2 - N_2$$

where $x(i,l)$ with $i=0, \ldots, N_1-1$ and $l=0, \ldots, N_2-1$ is the data block, $y(i,l)$ with $i=0, \ldots, M_1-1$ and $l=0, \ldots, M_2-1$ is the search block, and $c(n,m)$ with $n=0, \ldots, M_1-N_1$ and $m=0, \ldots, M_2-N_2$ is the cross correlation. If the input blocks have zero mean and unity variance, then Equation 14 becomes the CCF Equation 2. Since each input block is DFTed first, if the average or the mean of the block is not zero, it can be easily removed by simply forcing the DC component of the DFT to zero. This allows to compute a close approximation, called CCV2, to CCV in Equation 4, $$C_{CCV2}(n, m) = \sum_{i=0}^{N_1-1} \sum_{l=0}^{N_2-1} x(i, l) y(i+n, l+m) - \sum_{i=0}^{N_1-1} \sum_{l=0}^{N_2-1} x(i, l) \sum_{i=0}^{M_1-1} \sum_{l=0}^{M_2-1} y(i+n, l+m) \quad \text{(EQ 15)}$$

The difference is that $y(i+n,l+m)$ in Equation 4 is a moving average, whereas in Equation 15 it is a globe average. Because the bulk of operation in the method involves forward and inverse DFTs, a pair of data blocks and a pair of search blocks can be formed into a data block and a search block of complex data structure. Consequently, this method computes two motion vectors simultaneously. In the following description, $y(i+n,l+m)$ in Equation 14 is replaced with $y(i+n-D_1/2, l, m-D_2/2)$, where $n=-D_1/2, \ldots, D_1/2$ and $m=-D_2/2, \ldots, D_2/2$.

Step 1 102. Referring to FIG. 6, the input data blocks $y_1(i,l)$ 103 and $y_2(i,l)$ 105 are first combined into a complex blocks $w(i,l)$ 107 through the following relationship, $$w(i,l) = y_1(i, l) + j y_2(i, l) \quad \text{(EQ 16)}$$

-continued $$i = 0, \ldots, M_1 - 1$$
$$l = 0, \ldots, M_2 - 1$$

This arrangement involves no mathematical operation, just a conceptual rearranging of the data. Step 2 109. A DFT is performed along the rows (index l) of $w(i,l)$ 107 is performed to yield $W(i,s)$ 111, $$W(i, s) = \sum_{l=0}^{M_2-1} w(i, l) r^{-j \frac{2\pi sl}{M_2}} \quad \text{(EQ 17)}$$

$$i = 0, \ldots, M_1 - 1$$
$$s = 0, \ldots, M_2 - 1$$

The operations in Equation 17, and other DFT steps described here, can be done by one of several DFT algorithms, but the emphasis here is the SLT.

Step 3 113. This follows by performing DFT along the column (index i) to obtain $W(k,s)$ 117, $$W(k, s) = \sum_{i=0}^{M_1-1} \bar{W}(i, s) e^{-\frac{2\pi ik}{M_1}} = W_r(k, s) + j W_i(k, s) \quad \text{(EQ 18)}$$

$$k = 0, \ldots, M_1 - 1$$
$$s = 0, \ldots, M_2 - 1$$

Step 4 115. This step deals with the separation of $W(k,s)$ 117, which has complex data format, into $Y_1(k,s)$ 119 and $Y_2(k,s)$ 121, which are the DFTs of $Y_1(i,l)$ 103 and $Y_2(i,l)$ 105, respectively. This can be accomplished by using the following formulas $$\left. \begin{array}{l} Y_{1r}(k, s) = \frac{1}{2} [W_r(k, s) + W_r(M_1 - k, M_2 - s)] \\ Y_{1i}(k, s) = \frac{1}{2} [W_i(k, s) + W_r(M_1 - k, M_2 - s)] \\ Y_{2r}(k, s) = \frac{1}{2} [W_i(k, s) + W_i(M_1 - k, M_2 - s)] \\ Y_{2i}(k, s) = \frac{1}{2} [W_r(k, s) + W_r(M_1 - k, M_2 - s)] \\ k = 0, \ldots, M_1 - 1 \\ s = 0, \ldots, \frac{M_2}{2} \end{array} \right\} \quad \text{(EQ 19)}$$

where $$\left. \begin{array}{l} Y_{1r}(k, s) + j Y_{1i}(k,s) = Y_1(k, s) \\ Y_{2r}(k, s) + j Y_{2i}(k,s) = Y_2(k, s) \end{array} \right\} \quad \text{(EQ 20)}$$

-continued $$k = 0, \ldots, M_1 - 1$$
$$s = 0, \ldots, M_2 - 1$$

Note that only half of $Y_1(k,s)$ 119 and $Y_2(k,s)$ 121 are computed and the other half are obtained by using the conjugate symmetry property of DFT of real data, $$\left. \begin{array}{l} Y_{1r}(k, s) = Y_{1r}(M_1 - k, M_2 - s) \\ Y_{1i}(k, s) = -Y_{1i}(M_1 - k, M_2 - s) \\ Y_{2r}(k, s) = Y_{2r}(M_1 - k, M_2 - s) \\ Y_{2i}(k, s) = Y_{2i}(M_1 - k, M_2 - s) \end{array} \right\} \quad \text{(EQ 21)}$$

$$k = 0, \ldots, M_1 - 1$$

$$s = \frac{M_2}{2} + 1, \ldots, M_2 - 1$$

Step 5 123. The data blocks $x_1(i,l)$ 125 and $x_2(i,l)$ 127, both of the size of $N_1 \times N_2$, are first combined into $z(i,l)$ 129 that has a size of $M_1 \times M_2$, $$z(i, l) = \begin{cases} x_1\left(i - \frac{D_1}{2}, l - \frac{D_2}{2}\right) + jx_2\left(i - \frac{D_1}{2}, l - \frac{D_2}{2}\right) \\ 0 \end{cases} \quad \text{(EQ 22)}$$

$$i = \frac{D_1}{2}, \ldots, \frac{D_1}{2} + N_1 - 1$$

$$l = \frac{D_2}{2}, \ldots, \frac{D_2}{2} + N_2 - 1$$

where $D_1 = M_1 - N_1$ and $D_2 = M_2 - N_2$. Again, this arrangement involves no operation. Equation 21 indicates the input data blocks 125,127 occupy only the center portion of $z(i,l)$ 129, and the rest of $z(i,l)$ 129 are filled with zeros.

Step 6 131. Similar to the DFT procedures in Step 2 109, DFT of the rows of $z(i,l)$ 129 (index l) yields $\tilde{Z}(i,s)$ 135

$$\tilde{Z}(i, s) = \begin{cases} \sum_{l=D_2/2}^{D_2/2+N_2-1} x(i, l)e^{-j\frac{2\pi sl}{M_2}} \\ 0 \end{cases}$$

$$i = \frac{D_1}{2}, \ldots, \frac{D_1}{2} + N_1$$
$$s = 0, \ldots, M_2 - 1$$
otherwise Note that only $N_1$ rows need to be DFTed because the other $D_1 - M_1 = N_1$ rows contain only zeros, as indicated by the index i. Further reduction in operation is possible since in each of $N_1$ $M_2$-point DFT $M_2 - N_2$ input elements are zero, as indicated by the index l and a special SLT with fewer than normal inputs, as described above, can be used.

Step 7 133. Applying DFT to the columns (index i) $\tilde{Z}(i,s)$ 135 yields $Z(i,s)$ 139.

$$Z(k, s) = \sum_{i=D_1}^{D_1/2+N_1-1} \tilde{Z}(i, l)e^{-j\frac{2\pi ki}{M_1}} = Z_r(k,s) + jZ_i(k,s) \quad \text{(EQ 24)}$$

$$k = 0, \ldots, M_1 - 1$$
$$s = 0, \ldots, M_2 - 1$$

The number of operations needed to compute the DFTs in Equation 24 can be reduced because $M_1 - N_1$ elements in each column are zero, as indicated by the index l. Hence, a special SLT with fewer than normal inputs, as described above, can again be used here.

Step 8 137. The separation of $Z(k,s)$ 139 into $X_1(k,s)$ 141 and $X_2(k,s)$ 143 is analogous to the process in Step 4 115, that is $$\left. \begin{array}{l} X_{1r}(k, s) = \frac{1}{2}[Z_r(k, s) + Z_r(M_1 - k, M_2 - s)] \\ X_{1i}(k, s) = \frac{1}{2}[Z_i(k, s) + Z_r(M_1 - k, M_2 - s)] \\ X_{2r}(k, s) = \frac{1}{2}[Z_i(k, s) + Z_i(M_1 - k, M_2 - s)] \\ X_{2i}(k, s) = \frac{1}{2}[Z_r(k, s) + Z_r(M_1 - k, M_2 - s)] \end{array} \right\} \quad \text{(EQ 25)}$$

$$k = 0, \ldots, M_1 - 1$$

$$s = 0, \ldots, \frac{M_2}{2}$$

where $$\left. \begin{array}{l} X_{1r}(k, s) + jX_{1i}(k,s) = X_1(k, s) \\ X_{2r}(k, s) + jX_{2i}(k,s) = X_2(k, s) \end{array} \right\} \quad \text{(EQ 26)}$$

$$k = 0, \ldots, M_1 - 1$$
$$s = 0, \ldots, M_2 - 1$$

And similarly the other half are obtained from conjugate symmetry property $$\left. \begin{array}{l} X_{1r}(k, s) = X_{1r}(M_1 - k, M_2 - s) \\ X_{1i}(k, s) = -X_{1i}(M_1 - k, M_2 - s) \\ X_{2r}(k, s) = X_{2r}(M_1 - k, M_2 - s) \\ X_{2i}(k, s) = -X_{2i}(M_1 - k, M_2 - s) \end{array} \right\} \begin{array}{l} k=0,\ldots,M_1-1 \\ s = \frac{M_2}{2}+1,\ldots,M_2-1 \end{array} \quad \text{(EQ 27)}$$

Steps 1–4 102,109,113,115 and Steps 5–8 123,131,133, 137 are similar and can be performed in parallel if the necessary resources are available.

Step 9 145. In this step the frequency data blocks 119,141 are multiplied to obtain $U_1(k,s)$ 149, $$U_1(k, s) = X_1(k, s)Y_1^*(k, s) \quad \text{(EQ 28)}$$

$$k = 0, \ldots, M_1 - 1 \quad s = 0, \ldots, \frac{M_2}{2}$$

Since $X_1(k,s)$ 141 and $Y_1(k,s)$ 119 have conjugate symmetry property, so does $U_1(k,s)$ 149 and, as the result, only half of $U_1(k,s)$ 149 is computed.

Step 10 147. In this step $U_2(k,s)$ 151 is computed $$U_2(k, s) = X_2(k, s)Y_2^*(k, s) \quad \text{(EQ 29)}$$

$$k = 0, \ldots, M_1 - 1 \quad s = 0, \ldots, \frac{M_2}{2}$$

Again, Step 9 145 and Step 10 147 are independent processes and can be performed in parallel.

Step 11 153. Like forward DFT, the inverse DFT also operates on complex data. Therefore, to fully utilize $M_1 \times M_2$ inverse DFT, $U_1(k,s)$ 149 and $U_2(k,s)$ 151 must first be combined to form $P(k,s)$ 155 as the following $$P(k, s) = P_r(k, s) + jP_i(k, s) \quad \begin{array}{l} k = 0, \ldots, M_1 - 1 \\ s = 0, \ldots, M_2 - 1 \end{array} \quad \text{(EQ 30)}$$

and $$\left. \begin{array}{l} P_r(k, s) = U_{1r}(k, s) - U_{2i}(k, s) \\ P_i(k, s) = U_{2r}(k, s) + U_{1i}(k, s) \end{array} \right\} \begin{array}{l} k=0,\ldots,M_1-1 \\ s=0,\ldots,M_2-1 \end{array} \quad \text{(EQ 31)}$$

In Equation 30, when the other half of $U_1(k,s)$ 149 and $U_2(k,s)$ 151 are used, the following conjugate symmetry formula can be applied $$\left. \begin{array}{l} U_{1r}(k, s) = U_{1r}(M_1 - k, M_2 - s) \\ U_{1i}(k, s) = -U_{1i}(M_1 - k, M_2 - s) \\ U_{2r}(k, s) = U_{2r}(M_1 - k, M_2 - s) \\ U_{2i}(k, s) = -U_{2i}(M_1 - k, M_2 - s) \end{array} \right\} \begin{array}{l} k=0,\ldots,M_1-1 \\ s = \frac{M_2}{2}+1,\ldots,M_2-1 \end{array} \quad \text{(EQ 32)}$$

Step 12 157. Once $P(k,s)$ 155 is obtained, inverse DFTs can be performed along the columns (index k) to obtain $\tilde{P}(i,s)$ 161

$$\tilde{P}(i, s) = \frac{1}{M_1} \sum_{k=0}^{M_1-1} P(k, s) e^{j\frac{2\pi ik}{M_1}} \begin{array}{l} i = 0, \ldots, M_1 - 1 \\ s = 0, \ldots, M_2 - 1 \end{array} \quad \text{(EQ 33)}$$

Step 13 159. This follows by inverse DFT on rows (index s) to obtain p(i,l) 165

$$p(i,l) = \frac{1}{M_2} \sum_{s=0}^{M_2-1} \hat{P}(i,s) e^{j\frac{2\pi i s}{M_2}} = p_r(i,l) + jp_i(i,l) \quad \text{(EQ 34)}$$

$$i = 0, \ldots, \frac{D_1}{2}, M_1 - \frac{D_1}{2}, \ldots, M_1 - 1$$

$$l = 0, \ldots, \frac{D_2}{2}, M_2 - \frac{D_2}{2}, \ldots, M_2 - 1$$

where $D_1 = M_1 - N_1$ and $D_2 = M_2 - N_2$. Note that, since only part of p(i,l) 165 is needed, the inverse $D_2+1$ is only performed on $D_1+1$ rows, as indicated by the index i. Furthermore, since only $D_2+1$ columns are needed in p(i,l), as indicated by the index l, a special SLT can again be used to save operations.

Step 14 163. In this final step, p(i,l) 165 must separated into two cross correlation blocks. Because of the way the merge is performed in Step 11 153, no computation is needed for Step 14 163 and the two cross correlation blocks $c_1(n,m)$ 167 and $c_1(n,m)$ 169 are given by $$c_1(n,m) = \begin{cases} p_r(n,m) & n = 0, \ldots, D_1/2 & m = 0, \ldots, D_2/2 \\ p_r(M_1+n, M_2+m) & n = -1, \ldots, -D_1/2 & m = -1, \ldots, -D_2/2 \\ p_r(n, M_2+m) & n = 0, \ldots, D_1/2 & m = -1, \ldots, -D_2/2 \\ p_r(M_1+n, m) & n = -1, \ldots, -D_1/2 & m = 0, \ldots, -D_2/2 \end{cases} \quad \text{(EQ 35)}$$

$$c_2(n,m) = \begin{cases} p_i(n,m) & n = 0, \ldots, D_1/2 & m = 0, \ldots, D_2/2 \\ p_i(M_1+n, M_2+m) & n = -1, \ldots, -D_1/2 & m = -1, \ldots, -D_2/2 \\ p_i(n, M_2+m) & n = 0, \ldots, D_1/2 & m = -1, \ldots, -D_2/2 \\ p_i(M_1+n, m) & n = -1, \ldots, -D_1/2 & m = 0, \ldots, -D_2/2 \end{cases} \quad \text{(EQ 36)}$$

The indices n and m where $c_1(n,m)$ 167 and $c_1(n,m)$ 169 are maximum are the motion vector estimates for the data blocks $x_1(i,l)$ 125 and $x_2(i,l)$ 127.

Computation of Cross Correlation—Method B 101

In FIG. 7, a set of procedures are presented to show Method B 101. In this method, only two real input blocks are used and the output is one cross correlation block corresponding to Equation 14. Similar to Method A 100, the block size is kept arbitrary.

Step 1 207. Referring to FIG. 7, the search block y(i,l) 201 of the size of $M_1 \times M_2$ is first combined into a complex block $\hat{y}(i,l)$ 209 of the size of $M_1/2 \times M_2$ by the following formula, $$\hat{y}(i,l) = y(i,l) + jy\left(\frac{M_1}{2} + i, l\right) \quad \text{(EQ 37)}$$

$$i = 0, \ldots, \frac{M_1}{2} - 1 \quad l = 0, \ldots, M_2 - 1$$

This step requires no operation.

Step 2 211. Then DFT along the rows (index l) of $\hat{y}(i,l)$ 209 is performed to yield $\hat{Y}(i,s)$ 215

$$\hat{Y}(i,s) = \sum_{l=0}^{M_2-1} \hat{y}(i,l) e^{-j\frac{2\pi s l}{M_2}} = \hat{Y}_r(i,s) + j\hat{Y}_i(i,s) \quad \text{(EQ 38)}$$

$$i = 0, \ldots, \frac{M_1}{2} - 1$$

$$s = 0, \ldots, M_2 - 1$$

Step 3 213. This step deals with the split or separation of $\hat{Y}(i,s)$ 215 into a complex block $\tilde{Y}(i,s)$ 217 to be column DFTed, $$\left.\begin{array}{l} \tilde{Y}_r(i,s) = \frac{1}{2}[\hat{Y}_r(i,s) + \hat{Y}_r(i,M_2-s)] \\ \tilde{Y}_i(i,s) = \frac{1}{2}[\hat{Y}_i(i,s) - \hat{Y}_i(i,M_2-s)] \\ \tilde{Y}_r\left(i + \frac{M_1}{2}, s\right) = \frac{1}{2}[\hat{Y}_i(i,s) + \hat{Y}_i(i,M_2-s)] \\ \tilde{Y}_i\left(i + \frac{M_1}{2}, s\right) = -\frac{1}{2}[\hat{Y}_r(i,s) - \hat{Y}_r(i,M_2-s)] \end{array}\right\} \quad \text{(EQ 39)}$$

$$i = 0, \ldots, \frac{M_1}{2} - 1$$

$$s = 0, \ldots, \frac{M_2}{2}$$

where $$\tilde{Y}_r(i,s) + j\tilde{Y}_i(i,s) = \tilde{Y}(i,s) \quad i = 0, \ldots, M_1-1 \quad s = 0, \ldots, M_2-1 \quad \text{(EQ 40)}$$

Due to the conjugate symmetry, the other half of Equation 38 need not be computed and are simply given by $$\left.\begin{array}{l} \tilde{Y}_r(i,s) = \tilde{Y}_r(i,M_2-s) \\ \tilde{Y}_i(i,s) = -\tilde{Y}_i(i,M_2-s) \end{array}\right\} \quad \text{(EQ 41)}$$

$$i = 0, \ldots, M_1 - 1$$

$$s = \frac{M_2}{2} + 1, \ldots, M_2 - 1$$

Step 4 219. In this step DFTs are performed along the columns (index i) of $\tilde{Y}(i,s)$ 217 to yield $Y(i,s)$ 221

$$Y(k,s) = \sum_{i=0}^{M_1-1} \tilde{Y}(i,s) e^{-j\frac{2\pi ik}{M_1}} = Y_r(k,s) + jY_i(k,s) \quad \text{(EQ 42)}$$

$$k = 0, \ldots, M_1 - 1$$

$$s = 0, \ldots, \frac{M_2}{2}$$

which is the frequency domain representation of the data block $y(i,l)$ 201. Again, the other half of the block 221 have conjugate symmetry and are given by $$Y(k, M_2 - s) = Y^*(M_1 - k, s) \quad \text{(EQ 43)}$$
$$k = 0, \ldots, M_1 - 1$$

$$s = 1, \ldots, \frac{M_2}{2} - 1$$

which are not computed.

Step 5 223. The data block $x(i,l)$ 203 of the size of $N_1 \times N_2$ is first combined into a complex data block $\hat{x}(i,l)$ 225 of the size of $M_1/2 \times M_2$ $$\hat{x}(i,l) = \begin{cases} x\left(i - \frac{D_1}{2}, l - \frac{D_2}{2}\right) + jx\left(i - \frac{D_1}{2} + \frac{N_1}{2}, l - \frac{D_2}{2}\right) \\ 0 \end{cases} \quad \text{(EQ 44)}$$

$$i = \frac{D_1}{2}, \ldots, \frac{D_1}{2} + \frac{N_1}{2} - 1$$

$$l = \frac{D_2}{2}, \ldots, \frac{D_2}{2} + N_2 - 1$$

otherwise where $D_1 = M_1 - N_1$ and $D_2 = M_2 - N_2$.

Step 6 227. This is followed by $N_1/2$ DFTs on the rows (index l) $\hat{x}(i,l)$ 225, $$\hat{X}(i,s) = \sum_{l=D_2/2}^{D_2/2+N_2-1} \hat{x}(i,l) e^{-j\frac{2\pi sl}{M_2}} = \hat{X}_r(i,s) + j\hat{X}_i(i,s) \quad \text{(EQ 45)}$$

$$i = \frac{D_1}{2}, \ldots, \frac{D_1}{2} + \frac{N_1}{2} - 1$$

$$s = 0, \ldots, M_2 - 1$$

Note that since $D_2 = M_2 - N_2$ elements are zero for each row DFT, as indicated by index l, a special SLT can be used like before to save computations.

Step 7 229. This step is similar to Step 3 213 and $\hat{X}(i,s)$ 231 is split into a complex block $\tilde{X}(i,s)$ 233 to be column DFTed, $$\left. \begin{array}{l} \tilde{X}_r(i,s) = \frac{1}{2}[\hat{X}_r(i,s) + \hat{X}_r(i, M_2 - s)] \\ \tilde{X}_i(i,s) = \frac{1}{2}[\hat{X}_i(i,s) - \hat{X}_i(i, M_2 - s)] \\ \tilde{X}_r\left(i + \frac{M_1}{2}, s\right) = \frac{1}{2}[\hat{X}_i(i,s) + \hat{X}_i(i, M_2 - s)] \\ \tilde{X}_i\left(i + \frac{M_1}{2}, s\right) = -\frac{1}{2}[\hat{X}_r(i,s) - \hat{X}_r(i, M_2 - s)] \\ i = 0, \ldots, \frac{M_1}{2} - 1 \end{array} \right\} \quad \text{(EQ 46)}$$

$$s = 0, \ldots, \frac{M_2}{2}$$

where $$\tilde{X}_r(i,s) + j\tilde{X}_i(i,s) = \tilde{X}(i,s) \quad i=0, \ldots, M_1-1 \; s=0, \ldots, M_2-1 \quad \text{(EQ 47)}$$

Similarly, due to conjugate symmetry, the other half of the block are simply given by $$\left. \begin{array}{l} \tilde{X}_r(i,s) = \tilde{X}_r(i, M_2 - s) \\ \tilde{X}_i(i,s) = -\tilde{X}_i(i, M_2 - s) \end{array} \right\} \quad \text{(EQ 48)}$$

$$i = 0, \ldots, M_1 - 1$$
$$s = \frac{M_2}{2} + 1, \ldots, M_2 - 1$$

Step 8 235. In this step, DFTs along the columns (index i) of $\tilde{X}(i,s)$ 233 are computed, $$X(k,s) = \sum_{i=D_1/2}^{D_1/2+N_1-1} \tilde{X}(i,s) e^{-j\frac{2\pi ik}{M_1}} = X_r(k,s) + jX_i(k,s) \quad \text{(EQ 49)}$$

$$k = 0, \ldots, M_1 - 1$$
$$s = 0, \ldots, \frac{M_2}{2}$$

Similarly, $D_1 = M_1 - N_1$ elements are zero for each of the column DFTs, as indicated by index i, a special SLT can be used to reduce the number of computations. Conjugate symmetry property gives the other half of the block $$X(k, M_2 - s) = x^*(M_1 - k, s) \quad \text{(EQ 50)}$$

$$k = 0, \ldots, M_1 - 1$$
$$s = 1, \ldots, \frac{M_2}{2} - 1$$

Step 9 239. The frequency domain multiplication is performed in this step to obtain $U(k,s)$ 241, $$U(k,s) = X(k,s) Y^*(k,s) \quad \text{(EQ 51)}$$

$$k = 0, \ldots, M_1 - 1$$
$$s = 0, \ldots, \frac{M_2}{2}$$

Like $X(k,s)$ 237 and $Y(k,s)$ 221, $U(k,s)$ 241 has conjugate symmetry and the other half are not computed.

Step 10 243. IDFTs are performed on the columns (index k) of U(k,s) 241 in this step, $$\tilde{U}(i,s) = \frac{1}{M_1} \sum_{k=0}^{M_1-1} U(k,s) e^{j\frac{2\pi ik}{M_1}} = \tilde{U}_r(i,s) + j\tilde{U}_i(i,s) \quad \text{(EQ 52)}$$

$$i = 0, \ldots, M_1 - 1$$

$$c(n,m) = \begin{cases} \hat{u}_r(n,m) & n = 0, \ldots, D_1/2 \quad m = 0, \ldots, D_2/2 \\ \hat{u}_i\left(\frac{M_1}{2} + n, M_2 + m\right) & n = -1, \ldots -D_1/2 \quad m = -1, \ldots, -D_2/2 \\ \hat{u}_r(n, M_2 + m) & n = 0, \ldots, D_1/2 \quad m = -1, \ldots, -D_2/2 \\ \hat{u}_i\left(\frac{M_i}{2} + n, m\right) & n = -1, \ldots, -D_1/2 \quad m = 0, \ldots, D_2/2 \end{cases} \quad \text{(EQ 57)}$$

-continued $$s = 0, \ldots, \frac{M_2}{2}$$

Step 11 249. This step involves splitting the block $\tilde{U}(k,s)$ 245 into another block $\hat{U}(k,s)$ 247 before the row IDFTs are performed. The split is done according to the following formula, $$\hat{U}_r(i,s) = \begin{cases} \tilde{U}_r(i,s) - \tilde{U}_i\left(i + \frac{M_1}{2}, s\right) \\ \tilde{U}_r(i, M_2 - s) + \tilde{U}_i\left(i + \frac{M_i}{2}, M_2 - s\right) \end{cases} \quad \text{(EQ 53)}$$

$$i = 0, \ldots, \frac{M_1}{2} - 1 \quad s = 0, \ldots, \frac{M_2}{2}$$

$$i = 0, \ldots, \frac{M_1}{2} - 1 \quad s = \frac{M_2}{2} + 1, \ldots, M_2 - 1$$

$$\hat{U}_i(i,s) = \begin{cases} \tilde{U}_i(i,s) - \tilde{U}_r\left(i + \frac{M_1}{2}, s\right) \\ -\tilde{U}_i(i, M_2 - s) + \tilde{U}_r\left(i + \frac{M_1}{2}, M_2 - s\right) \end{cases} \quad \text{(EQ 54)}$$

$$i = 0, \ldots, \frac{M_1}{2} - 1 \quad s = 0, \ldots, \frac{M_2}{2}$$

$$i = 0, \ldots, \frac{M_1}{2} - 1 \quad s = \frac{M_2}{2} + 1, \ldots, M_2 - 1$$

where $$\hat{U}(i,s) = \hat{U}_r(i,s) + j\hat{U}_i(i,s) \quad \text{(EQ 55)}$$

$$i = 0, \ldots, \frac{M_1}{2} - 1$$
$$s = 0, \ldots, M_2 - 1$$

Step 12 251. IDFTs now are performed on the rows of $\hat{U}(i,s)$ 247 (index s) to obtain the spatial domain block $\hat{u}(i,l)$ 253

$$\hat{u}(i,l) = \frac{1}{M_2} \sum_{s=0}^{M_2-1} \hat{U}(i,s) e^{j\frac{2\pi ls}{M_2}} = \hat{u}_r(i,l) + j\hat{u}_i(i,l) \quad \text{(EQ 56)}$$

$$i = 0, \ldots, \frac{D_1}{2} - 1$$
$$l = 0, \ldots, \frac{D_2}{2}, \ldots, M_2 - \frac{D_2}{2}, \ldots, M_2 - 1$$

Note that only $D_1/2$ rows are IDFTed since the resultant cross correlation has smaller dimensions which are indicated in the next step. Furthermore, since only $D_2+1$ columns are needed in $\hat{u}(i,l)$, as indicated by the index l, a special SLT can be used to save computations.

Step 13 255. Finely in this step, the cross correlation c(n,m) 205 is obtained, This adjustment requires no operations. The indices n and m at which c(n,m) 205 is maximum is the motion vector estimate for the dam block x(i,l) 203.

What is claimed is:

1. A data compression method for compressing first image data representing a first image signal and having a plurality of data blocks stored in a memory, each data block representing a portion of said first image data, the steps of the method comprising:

(a) selecting first and second input data blocks from said plurality of data blocks in said first image;

(b) converting the input data blocks to a complex data block by making the first data block a real part and the second data block an imaginary part of said complex data block;

(c) transforming said complex data block to a complex frequency domain data block;

(d) converting said complex frequency domain data block into a first frequency domain data block representing said first input data block and a second frequency domain data block representing said second input data block;

(e) providing data representing a second image having a plurality of search blocks, and selecting first and second input search blocks from said data representing said second image, the input search blocks corresponding to a portion of said second image most likely to contain a best match to the input data blocks;

(f) converting the input search blocks to a complex search block having real and imaginary pads by making the first search block the real pad and the second search block the imaginary pad of said complex search block;

(g) transforming said complex search block to a complex first frequency domain search block;

(h) converting said complex frequency domain search block to a first frequency domain search block representing said first input search block and a second frequency domain search block representing said second input search block;

(i) multiplying the first frequency domain blocks to form a first resultant block and multiplying the second frequency domain blocks to form a second resultant block;

(j) converting said resultant blocks into a complex resultant block;

(k) inverse transforming the complex resultant block to a resultant spatial block having real and imaginary pads;

(l) determining first and second cross-correlations between said input data blocks and said input search blocks by separating the real and imaginary pads of said resultant spatial block wherein said real part is the first cross-correlation between the first input data and search blocks and said imaginary pad is the second cross-correlation between the second input data and search blocks;

(m) finding said best match for said first and second input data blocks from the cross-correlations calculated in step (l) based on predetermined criteria;

(n) repeating steps (a) through (m) for other of said plurality of data blocks so as to generate a plurality of best matches;

(o) generating a stream of compressed second image data representing a second image signal and corresponding to at least a portion of said first image signal and having substantially the same visual information content as said first image signal but representing said first image signal with less data than said first image data, said representation in accordance with said plurality of best matches; and (p) transmitting said generated stream of compressed second image data to a receiver.

2. The method recited in claim 1, wherein steps (c) and (g) comprise performing at least one discrete fourier transform.

3. The method recited in claim 1, further comprising the step for selecting the best cross-correlation from the cross-correlation calculated in step (l) by identifying the largest cross-correlation value.

4. The method recited in claim 1, wherein steps (c) and (g) transform only a portion of the complex blocks where transform input data has non-zero values.

5. The method recited in claim 1, wherein step (k) transforms only a portion of the complex resultant blocks where said complex resultant blocks have output data that not discarded.

6. A data compression method for compressing first image data representing a first image signal having at least one data block representing a position of said first image data in a memory, the steps of the method comprising:

(a) selecting an input data block from said at least one data block in said first image;

(b) conveding the said input data block to a complex data block by making half of the said input data block a real part and the other half of the said input data block an imaginary part of said complex data block;

(c) transforming said complex data block to a frequency domain data block representing said input data block;

(d) providing data representing a second image having a plurality of search blocks, and selecting an input search block from said data representing said second image, the input search block corresponding to a portion of said second image most likely to contain the best match to the input data block;

(e) converting the input search block to a complex search block having real and imaginary parts by making half of the input search block the real part and the other half of the input search block the imaginary part of said complex data block;

(f) transforming said complex search block to a frequency domain search block representing input search block;

(g) multiplying the frequency domain blocks to form a resultant block;

(h) inverse transforming said resultant block to a resultant spatial block;

(i) determining cross-correlations between said input data block and said input search block from said resultant spatial block; and (j) repeating steps (a) through (i) for others of said at least one data block so as to generate a plurality of cross-correlations;

(k) generating a stream of compressed second image data representing a second image signal and corresponding to at least a portion of said first image .signal and having substantially the same visual information content as said first image signal but representing said first image signal with less data than said first image data, said representation in accordance with said plurality of cross-correlations; and (l) transmitting said generated stream Of compressed second image data to a receiver.

7. The method recited in claim 6, wherein steps (c) and (f) comprise performing at least one discrete fourier transform.

8. The method recited in claim 6, further comprising the step of selecting the best cross-correlation from the cross-correlations calculated in step (i) based on predetermined criteria.

9. The method recited in claim 6, wherein steps (c) and (g) transform only a portion of the complex blocks where transform input data has non-zero values.

10. The method recited in claim 6, wherein step (k) transforms only a portion of the resultant blocks where said resultant blocks have output data that is not discarded.

11. A device for compressing data representing data frames of an image having a plurality of data blocks, each data block being made of a portion of a first data frame, said device comprising:

a frame memory for storing at least portions of a second data frame;

a motion estimator, including:

a data controller for selecting first and second input data blocks from said plurality of data blocks in said first data frame, and for selecting from said frame memory, first and second input search blocks from said second data frame, said input search blocks corresponding to a portion of said second data frame most likely to contain the best cross-correlation to said input data blocks;

a plurality of data processor means operable in parallel to perform data processing operations including operations on said data and search blocks under program control, said plurality of processors including:

processor means for converting the input data blocks to a complex data block having real and imaginary parts by making the first data block the real part and the second data block the imaginary part of said complex data block;

processor means for transforming said complex data block to a first frequency domain data block representing said first input data block and a second frequency domain data block representing said second input data block;

processor means for converting the input search blocks to a complex search block having real and imaginary parts by making the first search block the real part and the second search block the imaginary part of said complex search block;

processor means for transforming said complex search block to a first frequency domain search block representing said first input search block and a second frequency domain search block representing said second input search block;

processor means for multiplying the first frequency domain blocks to form a first resultant block and multiplying the second frequency domain blocks to form a second resultant block;

processor means for inverse transforming the result blocks to a resultant spatial block having real and imaginary parts; and processor means for determining first and second cross-correlations between said input data blocks and said input search blocks by separating the real and imaginary parts of said resultant spatial block wherein said real part is the first cross-correlation between the first input data and search blocks and said imaginary part is the second cross-correlation between the second cross-correlation between the second input data and search blocks;

means, coupled to said motion estimator, for generating a stream of compressed data representing at least a portion of said first data frame based on said first and second cross-correlations; and a transmitter that transmits said stream of compressed data.

12. A device for compressing data representing a data frame having at least one data block, said device comprising:

a frame memory for storing at least portions of said first data frame and said second data frame;

a motion vector estimator, including:

a data controller for selecting at least one input data block from said at least one data block in said first data frame and for selecting from said frame memory at least one input search block from said second data frame, the input search blocks corresponding to a portion of a second data frame most likely to contain the best cross-correlation to the input data blocks;

a plurality of data processor means operable in parallel to perform data processing operations including Operations on said data and search blocks under program control, said plurality of processors including:

processor means for converting the input data blocks to a complex data block;

processor means for transforming said complex data block to a frequency domain data block representing said input data blocks;

processor means for converting the input search blocks to a complex search block;

processor means for transforming said complex search block to a frequency domain search block representing said input search blocks;

processor means for multiplying the frequency domain blocks to form a resultant block;

processor means for inverse transforming said resultant block to a resultant spatial block; and processor means for determining cross-correlations between said input data block and said input search block from said resultant spatial block;

means, coupled to said motion vector estimator, for generating a stream of compressed data representing at least a portion of said first data frame based on said cross-correlations; and a transmitter that transmits said stream of compressed data.

13. The device recited in claim 12, wherein:

said data controller selects only one input data block in said first data frame and selects only one input search block from said second data frame;

said plurality of data processor means converts said input data block to a complex data block having real and imaginary pads by making a first portion of the input data block the real part and a second portion of data block the imaginary part of said complex data block; and said plurality of data processor means converts said input search block to a complex search block having real and imaginary parts by making a first portion of the input search block the real part and a second portion of the input search block the imaginary part of said complex search block.

14. The device recited in claim 13, wherein:

said first portion of the input data block is one-half of the input data block;

said second portion of the input data block is the other half of the input data block;

said first portion of the input search block is one-half of the input search block; and said second portion of the input search block is the other half of the input search block.

15. A device for compressing data representing a data frame having at least one data block, comprising:

a frame memory for storing at least portions of said first data frame and said second data frame;

a motion vector estimator, including:

a data controller for selecting at least one input data block from said at least one data block in said first data frame and for selecting from said frame memory at least one input search block from said second data frame, the input search blocks corresponding to a portion of a second data frame most likely to contain the best cross-correlation to the input data blocks;

first data processing apparatus that under program control perform data processing operations, said first data processing apparatus including:

processor means for converting the input data blocks to a complex data block;

processor means for transforming said complex data block to a frequency domain data block representing said input data blocks;

processor means .for converting the input search blocks to a complex search block;

processor means for transforming said complex search block to a frequency domain search block representing said input search blocks;

processor means for multiplying the frequency domain blocks to form a resultant block;

processor means for inverse transforming said resultant block to a resultant spatial block; and processor means for determining cross-correlations between said input data block and said input search block from said resultant spatial block; and second data processing apparatus, coupled to said motion vector estimator, for generating a stream of compressed data representing at least a portion of said first data frame based on said cross-correlations; and a transmitter that transmits said stream of compressed data.

16. A device for compressing data representing a data frame having at least one data block, comprising:

a frame memory for storing at least portions of said first data frame and said second data frame;

data processing apparatus coupled to said frame memory and programmed to perform data processing operations;

a motion vector estimator, including:

a data controller for selecting at least one input data block from said at least one data block in said first data frame and for selecting from said frame memory at least one input search block from said second data frame, the input search blocks corresponding to a portion of a second data frame most likely to contain the best cross-correlation to the input data blocks;

said data processing apparatus including:
  processor means for converting the input data blocks to a complex data block;
  processor means for transforming said complex data block to a frequency domain data block representing said input data blocks;
  processor means for converting the input search blocks to a complex search block;
  processor means for transforming said complex search block to a frequency domain search block representing said input search blocks;
  processor means for multiplying the frequency domain blocks to form a resultant block;
  processor means for inverse transforming said resultant block to a resultant spatial block; and
  processor means for determining cross-correlations between said input data block and said input search block from said resultant spatial block;

said data processing apparatus being coupled to said motion vector estimator and programmed to generate a stream of compressed data representing at least a portion of said first data frame based on said cross-correlations; and a transmitter that transmits said stream of compressed data.

* * * * *